(12) United States Patent
Miyake

(10) Patent No.: US 10,372,272 B2
(45) Date of Patent: Aug. 6, 2019

(54) SENSOR, INPUT DEVICE, AND INPUT/OUTPUT DEVICE

(71) Applicant: Semiconductor Energy Laboratory Co., Ltd., Kanagawa-ken (JP)

(72) Inventor: Hiroyuki Miyake, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 51 days.

(21) Appl. No.: 14/725,457

(22) Filed: May 29, 2015

(65) Prior Publication Data

US 2015/0346867 A1    Dec. 3, 2015

(30) Foreign Application Priority Data

May 30, 2014  (JP) ................ 2014-112206

(51) Int. Cl.
| | | |
|---|---|---|
| *G06F 3/044* | (2006.01) | |
| *G06F 3/041* | (2006.01) | |
| *G06F 3/047* | (2006.01) | |
| *G06F 1/16* | (2006.01) | |
| *G06G 5/00* | (2006.01) | |

(Continued)

(52) U.S. Cl.
CPC ............ *G06F 3/044* (2013.01); *G06F 1/1652* (2013.01); *G06F 3/047* (2013.01); *G09G 3/20* (2013.01); *G09G 5/003* (2013.01); *G06F 2203/04101* (2013.01); *G06F 2203/04102* (2013.01); *G06F 2203/04104* (2013.01);
(Continued)

(58) Field of Classification Search
CPC ........ G06F 3/044; G06F 3/0412; G06F 3/047; G06F 1/1652; G06F 2203/04101; G06F 2203/04102; G06F 2203/04104; G06F 2203/04112; G09G 5/003; G09G 3/20; G09G 2354/00; G09G 2300/023; G09G 2300/0426
USPC ........................................... 345/173–174, 87
See application file for complete search history.

(56) References Cited

U.S. PATENT DOCUMENTS

| | | | |
|---|---|---|---|
| 7,755,369 B2* | 7/2010 | Chuang ............... | G06K 9/0002 324/649 |
| 7,884,810 B2* | 2/2011 | Jang .................... | G06K 9/0002 345/174 |

(Continued)

FOREIGN PATENT DOCUMENTS

| | | | | |
|---|---|---|---|---|
| CN | 101067918 A | * | 11/2007 | ........... G09G 3/3406 |
| CN | 101067918 A | * | 11/2007 | ........... G09G 3/3406 |

(Continued)

*Primary Examiner* — Vinh T Lam
(74) *Attorney, Agent, or Firm* — Husch Blackwell LLP

(57) ABSTRACT

A novel input sensor that is highly convenient or reliable is provided. A novel input device that is highly convenient or reliable is provided. A novel input/output device that is highly convenient or reliable is provided. The sensor, the input device, and the input/output device include a sensor element and a sensor circuit which includes first to third transistors. A gate of the first transistor is electrically connected to one of a source and a drain of the third transistor and to a first electrode of the sensor element. One of a source and a drain of the first transistor is electrically connected to a second electrode of the sensor element and to a first wiring through which a control signal capable of controlling a potential of the second electrode of the sensor element is configured to be supplied.

21 Claims, 8 Drawing Sheets

(51) Int. Cl.
*G09G 5/00* (2006.01)
*G09G 3/20* (2006.01)

(52) U.S. Cl.
CPC ............... *G09G 2300/023* (2013.01); *G09G 2300/0426* (2013.01); *G09G 2354/00* (2013.01)

(56) References Cited

U.S. PATENT DOCUMENTS

| | | | |
|---|---|---|---|
| 8,089,476 B2 * | 1/2012 | Ishiguro | G02F 1/13338 345/173 |
| 8,415,208 B2 | 4/2013 | Takayama et al. | |
| 8,610,155 B2 | 12/2013 | Hatano et al. | |
| 8,823,893 B2 | 9/2014 | Yamazaki | |
| 9,184,408 B2 | 11/2015 | Saito et al. | |
| 9,696,843 B2 | 7/2017 | Tan et al. | |
| 2009/0033850 A1 * | 2/2009 | Ishiguro | G02F 1/13338 349/116 |
| 2010/0079406 A1 * | 4/2010 | Chen | G06F 3/0412 345/174 |
| 2011/0273397 A1 | 11/2011 | Hanari | |
| 2011/0310057 A1 | 12/2011 | Wang | |
| 2012/0217516 A1 | 8/2012 | Hatano et al. | |
| 2013/0257798 A1 | 10/2013 | Tamura et al. | |
| 2013/0321333 A1 | 12/2013 | Tamura | |
| 2014/0043546 A1 | 2/2014 | Yamazaki et al. | |
| 2014/0240617 A1 | 8/2014 | Fukutome et al. | |
| 2015/0355763 A1 | 12/2015 | Miyake et al. | |
| 2016/0246422 A1 * | 8/2016 | Tan | G06F 3/0412 |
| 2016/0246424 A1 * | 8/2016 | Yang | G06F 3/0412 |
| 2017/0078468 A1 * | 3/2017 | Cho | G06F 1/1652 |

FOREIGN PATENT DOCUMENTS

| | | | | |
|---|---|---|---|---|
| CN | 103325341 A | | 9/2013 | |
| EP | 2 654 082 A2 | | 10/2013 | |
| JP | 2003-174153 A | | 6/2003 | |
| JP | 2003-196023 A | | 7/2003 | |
| JP | 2009-003916 A | | 1/2009 | |
| JP | 2010-153813 A | | 7/2010 | |
| JP | 2011-237489 A | | 11/2011 | |
| JP | 2012-190794 A | | 10/2012 | |
| JP | 2013-224977 A | | 10/2013 | |
| KR | 20060040465 | * | 11/2007 | ............... H04N 5/66 |
| KR | 20150077710 A | * | 7/2015 | ........... G09G 3/3233 |
| KR | 20150077710 A | * | 7/2015 | ........... G09G 3/3233 |

\* cited by examiner

FIG. 2A
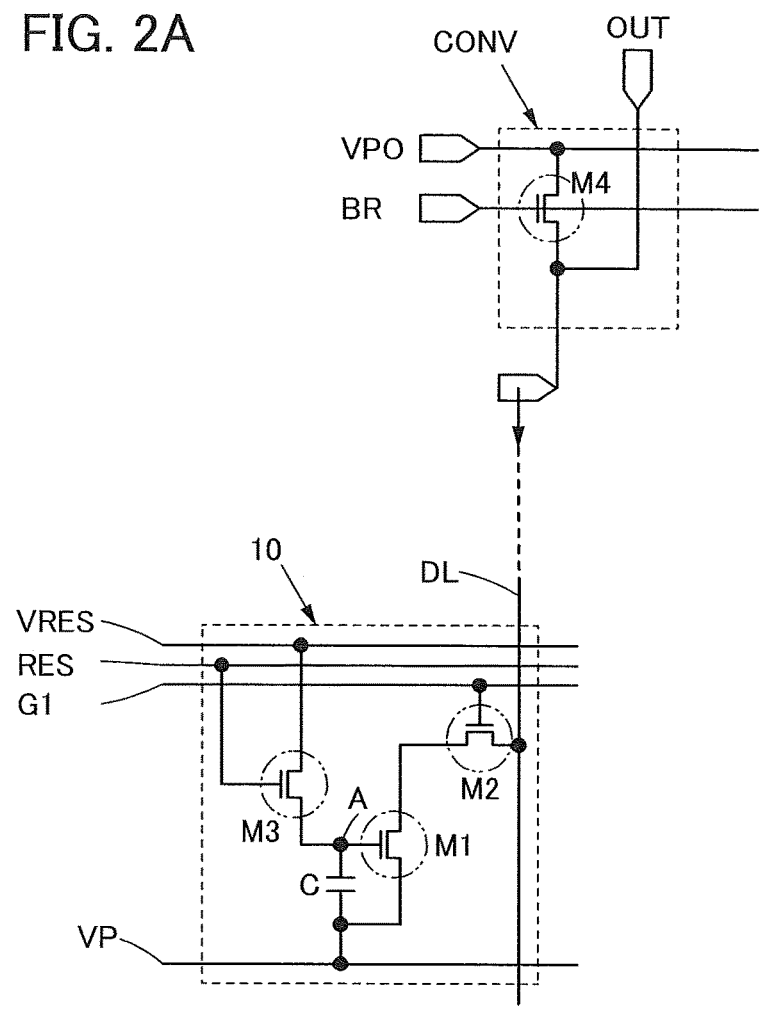
FIG. 2B1
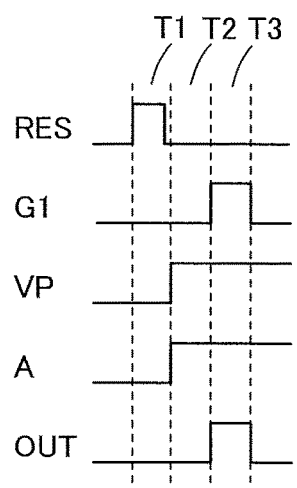
FIG. 2B2
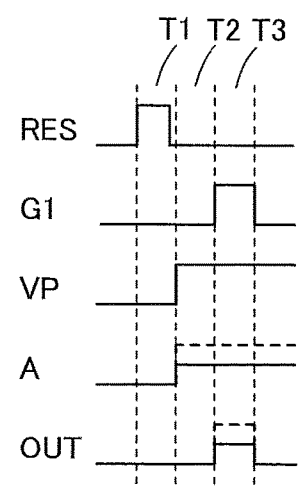

FIG. 4A
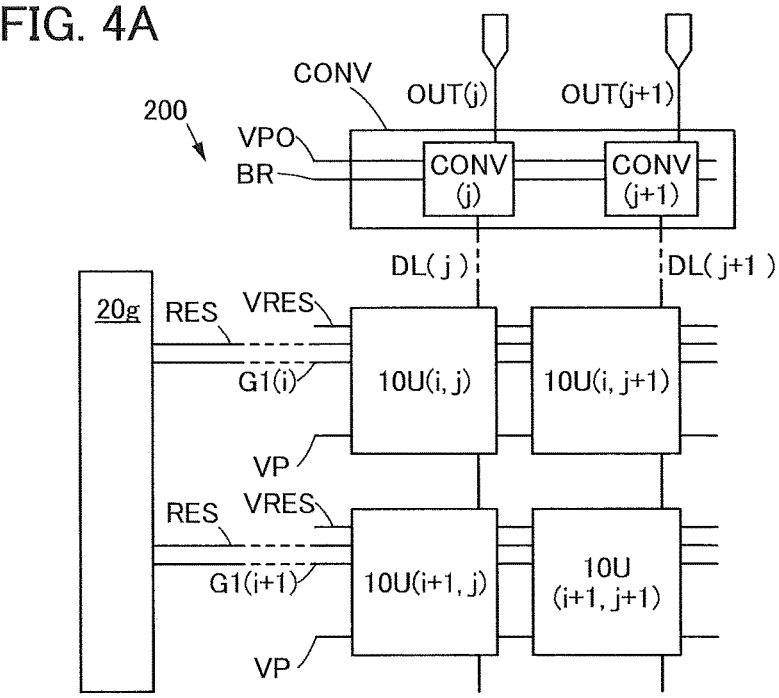
FIG. 4B1
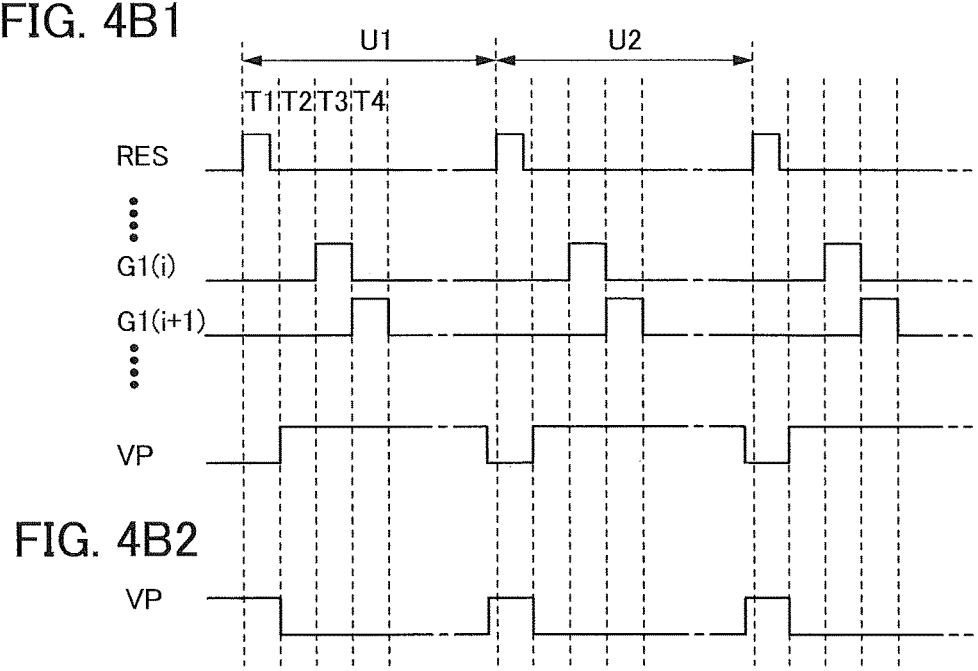
FIG. 4B2

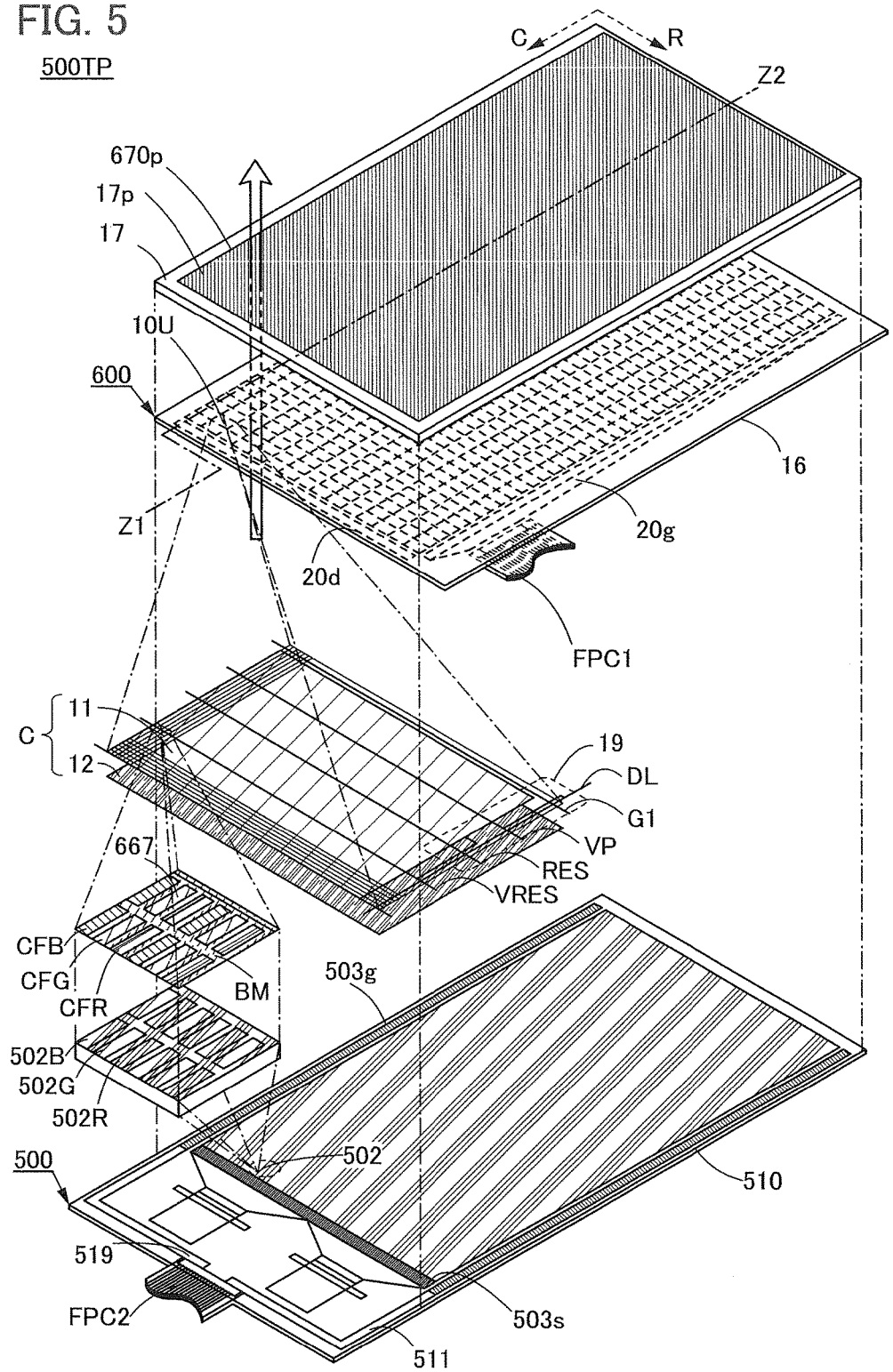

FIG. 8A1
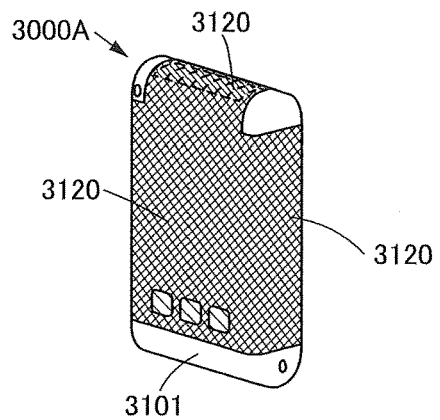
FIG. 8A2
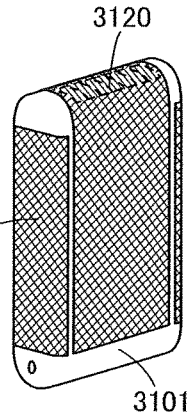
FIG. 8A3
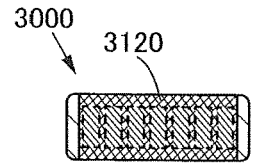
FIG. 8B1
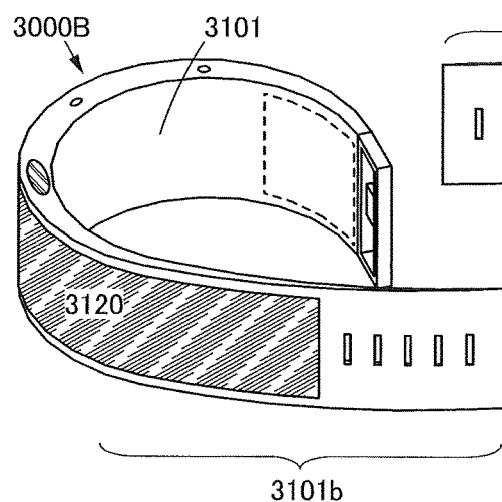
FIG. 8B2
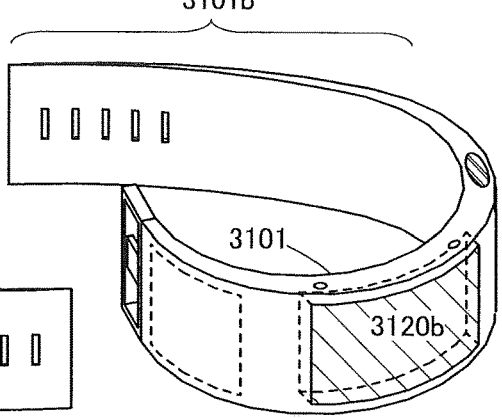
FIG. 8C1
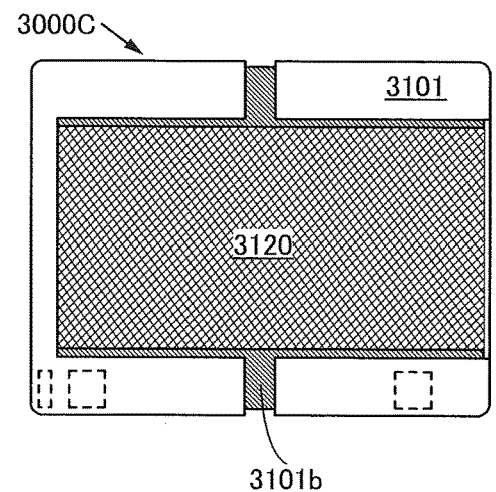
FIG. 8C2
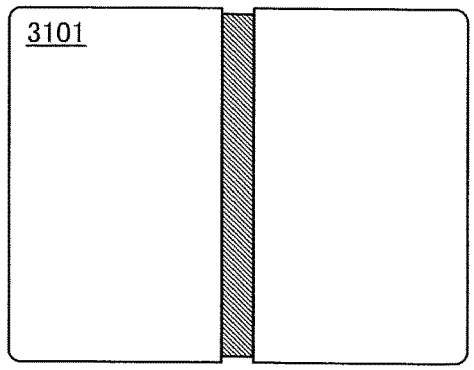

SENSOR, INPUT DEVICE, AND INPUT/OUTPUT DEVICE

BACKGROUND OF THE INVENTION

1. Field of the Invention

One embodiment of the present invention relates to a sensor, an input device, or an input/output device.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method of driving any of them, and a method of manufacturing any of them.

2. Description of the Related Art

The social infrastructures relating to means for transmitting data have advanced. This has made it possible to acquire, process, and send out various kinds and plenty of data with the use of a data processing device not only at home or office but also at other visiting places.

With this being the situation, portable data processing devices are under active development.

For example, a data processing device is often used while being carried around, and force might be accidentally applied by dropping to the data processing device and a display device used in it. As an example of a display device that is not easily broken, a display device having high adhesiveness between a structure body by which a light-emitting layers are partitioned and a second electrode layer is known (Patent Document 1).

For example, a cellular phone in which a display device is placed on the front face of a housing and on the upper portion in the longitudinal direction is known (Patent Document 2).

Patent Document 3 discloses a flexible active matrix light-emitting device in which an organic electroluminescence (EL) element and a transistor serving as a switching element are provided over a flexible substrate.

REFERENCES

Patent Documents

[Patent Document 1] Japanese Published Patent Application No. 2012-190794
[Patent Document 2] Japanese Published Patent Application No. 2010-153813
[Patent Document 3] Japanese Published Patent Application No. 2003-174153

SUMMARY OF THE INVENTION

An object of one embodiment of the present invention is to provide a novel data processing device that is highly convenient or reliable. Another object is to provide a novel data processing device.

An object of one embodiment of the present invention is to provide a flexible sensor, a flexible input device, or a flexible input/output device. Another object is to provide a lightweight input/output device. Another object is to provide a thin input device or input/output device. Another object is to provide an input device or input/output device with high detection sensitivity. Another object is to achieve both the small thickness and high detection sensitivity of a sensor, an input device, or an input/output device. Another object is to provide a sensor that can be used in a large-sized input device or input/output device. Another object is to provide a large-sized input device or input/output device.

An object of one embodiment of the present invention is to provide a novel sensor that is highly convenient or reliable. Another object is to provide a novel input device that is highly convenient or reliable. Another object is to provide a novel input/output device that is highly convenient or reliable. Another object is to provide a novel sensor, a novel input device, a novel input/output device, or a novel semiconductor device.

Note that the descriptions of these objects do not preclude the existence of other objects. In one embodiment of the present invention, there is no need to achieve all the objects. Other objects will be apparent from and can be derived from the description of the specification, the drawings, the claims, and the like.

One embodiment of the present invention is a sensor including a sensor element, a sensor circuit electrically connected to the sensor element, and a flexible base layer supporting the sensor element and the sensor circuit.

The sensor circuit includes first to third transistors. A gate of the first transistor is electrically connected to one of a source and a drain of the third transistor and one electrode of the sensor element. One of a source and a drain of the first transistor is electrically connected to a first wiring and the other electrode of the sensor element. The other of the source and the drain of the first transistor is electrically connected to one of a source and a drain of the second transistor. A gate of the second transistor is electrically connected to a second wiring. The other of the source and the drain of the second transistor is electrically connected to a third wiring. A gate of the third transistor is electrically connected to a fourth wiring. The other of the source and the drain of the third transistor is electrically connected to a fifth wiring.

In the above structure, the sensor circuit supplies a sensor signal based on a change in the potential of the gate of the first transistor.

In the above structure, the sensor circuit supplies the sensor signal based on a change in the capacitance of the sensor element.

Another embodiment of the present invention is a sensor including a sensor element, a sensor circuit electrically connected to the sensor element, and a flexible base layer supporting the sensor element and the sensor circuit.

The sensor circuit includes first to third transistors. A gate of the first transistor is electrically connected to one of a source and a drain of the third transistor and one electrode of the sensor element. One of a source and a drain of the first transistor is electrically connected to a first wiring, through which a control signal capable of controlling a potential of the other electrode of the sensor element can be supplied, and to the other electrode of the sensor element. The other of the source and the drain of the first transistor is electrically connected to one of a source and a drain of the second transistor. A gate of the second transistor is electrically connected to a second wiring through which the selection signal can be supplied. The other of the source and the drain of the second transistor is electrically connected to a third wiring through which a sensor signal can be supplied. A gate of the third transistor is electrically connected to a fourth wiring through which a reset signal can be supplied. The other of the source and the drain of the third transistor is electrically connected to a fifth wiring through which a ground potential can be supplied.

In the above structure, the sensor circuit supplies a sensor signal based on a change in the potential of the gate of the first transistor.

In the above structure, the sensor circuit supplies the sensor signal based on a change in the capacitance of the sensor element.

One embodiment of the present invention is a sensor including a window portion transmitting visible light, a sensor element having a light transmitting property and overlapping with the window portion, a sensor circuit electrically connected to the sensor element, and a flexible base layer supporting the sensor element and the sensor circuit.

The sensor element includes an insulating layer, and a first electrode and a second electrode between which the insulating layer is interposed. The sensor circuit supplies a sensor signal on the basis of a change in the capacitance of the sensor element.

Another embodiment of the present invention is a sensor in which the sensor circuit includes a first transistor, a second transistor, and a third transistor. A gate of the first transistor is electrically connected to one of a source and a drain of the third transistor and to a first electrode of the sensor element. One of a source and a drain of the first transistor is electrically connected to a second electrode of the sensor element and to a first wiring through which a control signal capable of controlling a potential of the second electrode of the sensor element can be supplied. The other of the source and the drain of the first transistor is electrically connected to one of a source and a drain of the second transistor. A gate of the second transistor is electrically connected to a second wiring through which the selection signal can be supplied. The other of the source and the drain of the second transistor is electrically connected to a third wiring through which a sensor signal can be supplied. A gate of the third transistor is electrically connected to a fourth wiring through which a reset signal can be supplied. The other of the source and the drain of the third transistor is electrically connected to a fifth wiring through which a ground potential can be supplied.

In the above structure, the sensor circuit supplies a sensor signal based on a change in the potential of the gate of the first transistor.

In the above structure, the sensor circuit supplies the sensor signal based on a change in the capacitance of the sensor element.

The above sensor of one embodiment of the present invention includes the window portion which transmits visible light, the light-transmitting sensor element which includes the insulating layer and a pair of electrodes between which the insulating layer is interposed and overlaps with the window portion, the sensor circuit which supplies the sensor signal on the basis of a change in the capacitance of the sensor element, and the flexible base layer supporting the sensor element and the sensor circuit.

Note that the capacitance of the sensor element is changed when an object gets close to one electrode or the other electrode or when a distance between one electrode and the other electrode is changed, for example. Thus, the sensor can supply the sensor signal based on a change in the capacitance of the sensor element, can transmit visible light, and can be bent. Consequently, a novel sensor that is highly convenient or reliable can be provided.

One of the source and the drain of the first transistor and the second electrode of the sensor element are electrically connected to the first wiring through which the control signal capable of controlling the potential of the second electrode of the sensor element can be supplied. Even in the case where noise enters the first wiring, for example, a difference between the potential of the signal supplied to the first wiring and the potential of the first electrode of the sensor element (a potential difference between the electrodes of the sensor element) can be kept constant more easily than in the structure of a sensor circuit in which the second electrode of the sensor element and one of the source and the drain of the first transistor are connected to different wirings. Accordingly, a change in the capacitance of the sensor element due to noise can be reduced, and interference with the sensor signal due to noise can be reduced. This increases the sensitivity of the sensor, so that the novel sensor can be highly reliable.

One embodiment of the present invention is an input device including a plurality of sensor units arranged in a matrix, second wirings to which the plurality of sensor units placed along a row direction are electrically connected, third wirings to which the plurality of sensor units placed along a column direction are electrically connected, and a flexible base layer provided with the sensor units, the second wirings, and the third wirings.

Each sensor unit includes a window portion transmitting visible light, a sensor element overlapping with the window portion, and a sensor circuit electrically connected to the sensor element. The sensor element includes an insulating layer, and a first electrode and a second electrode between which the insulating layer is interposed. The sensor circuit is supplied with a selection signal and supplies a sensor signal on the basis of a change in the capacitance of the sensor element. The selection signal can be supplied through the second wirings. The sensor signal can be supplied through the third wirings.

The above input device of one embodiment of the present invention includes the sensor units which are arranged in a matrix and include the window portions which transmit visible light, the light-transmitting sensor elements which include the insulating layer and a pair of electrodes between which the insulating layer is interposed and overlap with the window portions, the sensor circuits which supply the sensor signal on the basis of a change in the capacitance of the sensor element, and the flexible base layer supporting the sensor units.

Note that the capacitance of the sensor element is changed when an object gets close to the first electrode or the second electrode or when the distance between the first electrode and the second electrode is changed, for example. Thus, the input device can supply the positional data of a sensor unit and the sensor signal detected by the sensor unit, can transmit visible light, and can be bent. Consequently, a novel input device that is highly convenient or reliable can be provided.

One embodiment of the present invention is an input/output device comprising an input device including a plurality of sensor units which include window portions transmitting visible light and are arranged in a matrix, second wirings to which the plurality of sensor units placed along the row direction are electrically connected, third wirings to which the plurality of sensor units placed along the column direction are electrically connected, and a first flexible base layer supporting the plurality of sensor units, the second wirings, and the third wirings. The input/output device further comprises a display portion including a plurality of pixels that are arranged in a matrix and overlap with the window portions and a second flexible base layer supporting the pixels.

Each sensor unit includes a sensor element overlapping with the window portion and a sensor circuit electrically connected to the sensor element. The sensor element includes an insulating layer, and a first electrode and a second electrode between which the insulating layer is interposed. The sensor circuit is supplied with a selection signal and supplies a sensor signal on the basis of a change in the capacitance of the sensor element. The selection signal can be supplied through the second wirings. The sensor signal can be supplied through the third wirings. The sensor circuit is placed so as to overlap with gaps between the window portions.

The above input/output device of one embodiment of the present invention includes a flexible input device including the plurality of sensor units provided with the window portions which transmit visible light, the flexible display portion including the plurality of pixels overlapping with the window portions, and the coloring layer between the window portion and the pixel.

Thus, the input/output device can supply the sensor signal based on a change in capacitance and the positional data of the sensor unit that supplies the sensor signal, can display image data associated with the positional data of the sensor unit, and can be bent. As a result, a novel input/output device that is highly convenient or reliable can be provided.

One embodiment of the present invention is an input/output device comprising an input device including a plurality of sensor units which include window portions transmitting visible light and are arranged in a matrix, first to five wirings, and a first flexible base layer supporting the plurality of sensor units and the first to five wirings. The input/output device further comprises a display portion including a plurality of pixels that are arranged in a matrix and overlap with the window portions and a second flexible base layer supporting the pixels.

The plurality of sensor units placed along the row direction are electrically connected to the second wirings. The plurality of sensor units placed along the column direction are electrically connected to the third wirings.

Each sensor unit includes a sensor element overlapping with the window portion and a sensor circuit electrically connected to the sensor element. The sensor circuit includes first to third transistors. A gate of the first transistor is electrically connected to one of a source and a drain of the third transistor and one electrode of the sensor element. One of a source and a drain of the first transistor is electrically connected to a first wiring and the other electrode of the sensor element. The other of the source and the drain of the first transistor is electrically connected to one of a source and a drain of the second transistor. A gate of the second transistor is electrically connected to a second wiring. The other of the source and the drain of the second transistor is electrically connected to a third wiring. A gate of the third transistor is electrically connected to a fourth wiring. The other of the source and the drain of the third transistor is electrically connected to a fifth wiring. Through the second wiring, a selection signal can be supplied. Through the third wiring, the sensor signal can be supplied. The sensor circuit is placed so as to overlap with gaps between the window portions.

In the above structure, the sensor circuit supplies a sensor signal based on a change in the potential of the gate of the first transistor.

In the above structure, the sensor circuit supplies the sensor signal based on a change in the capacitance of the sensor element.

One embodiment of the present invention is an input/output device comprising an input device including a plurality of sensor units which include window portions transmitting visible light and are arranged in a matrix, first to five wirings, and a first flexible base layer supporting the plurality of sensor units and the first to five wirings. The input/output device further comprises a display portion including a plurality of pixels that are arranged in a matrix and overlap with the window portions and a second flexible base layer supporting the pixels.

The plurality of sensor units placed along the row direction are electrically connected to the second wirings. The plurality of sensor units placed along the column direction are electrically connected to the third wirings.

Each sensor unit includes a sensor element overlapping with the window portion and a sensor circuit electrically connected to the sensor element. The sensor circuit includes first to third transistors. A gate of the first transistor is electrically connected to one of a source and a drain of the third transistor and one electrode of the sensor element. One of a source and a drain of the first transistor is electrically connected to a first wiring, through which a control signal capable of controlling a potential of the other electrode of the sensor element can be supplied, and to the other electrode of the sensor element. The other of the source and the drain of the first transistor is electrically connected to one of a source and a drain of the second transistor. A gate of the second transistor is electrically connected to a second wiring through which the selection signal can be supplied. The other of the source and the drain of the second transistor is electrically connected to a third wiring through which a sensor signal can be supplied. A gate of the third transistor is electrically connected to a fourth wiring through which a reset signal can be supplied. The other of the source and the drain of the third transistor is electrically connected to a fifth wiring through which a ground potential can be supplied. The sensor circuit is placed so as to overlap with gaps between the window portions.

In the above structure, the sensor circuit supplies a sensor signal on the basis of a change in the potential of the gate of the first transistor.

In the above structure, the sensor circuit supplies the sensor signal based on a change in the capacitance of the sensor element.

Note that in this specification, the term EL layer refers to a layer provided between a pair of electrodes in a light-emitting element. Thus, a light-emitting layer containing an organic compound that is a light-emitting substance which is interposed between electrodes is an embodiment of the EL layer.

In this specification, in the case where a substance A is dispersed in a matrix formed using a substance B, the substance B forming the matrix is referred to as a host material, and the substance A dispersed in the matrix is referred to as a guest material. Note that the substance A and the substance B may each be a single substance or a mixture of two or more kinds of substances.

Note that the term light-emitting device in this specification means an image display device or a light source (including a lighting device). In addition, the light-emitting device might include any of the following modules in its category: a module in which a connector such as a flexible printed circuit (FPC) or a tape carrier package (TCP) is attached to a light-emitting device; a module having a TCP provided with a printed wiring board at the end thereof; and a module having an integrated circuit (IC) directly mounted on a substrate over which a light-emitting element is formed by a chip on glass (COG) method.

In a block diagram attached to this specification, components are classified according to their functions and shown as independent blocks; however, it is practically difficult to completely separate the components according to their functions, and one component may have a plurality of functions.

In this specification, the terms source and drain of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. Furthermore, in a p-channel transistor, a terminal to which a lower potential is applied is called a drain, and a terminal to which a higher potential is applied is called a source. In this specification, although connection relationship of a transistor is described assuming that the source and the drain are fixed in some cases for convenience, actually, the names of the source and the drain interchange with each other depending on the relation of the potentials.

In this specification, the term source of a transistor means a source region that is part of a semiconductor film functioning as an active layer or a source electrode connected to the semiconductor film. Similarly, the term drain of a transistor means a drain region that is part of the semiconductor film or a drain electrode connected to the semiconductor film. In addition, the term gate means a gate electrode.

In this specification, a state in which transistors are connected in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

The term connection in this specification means electrical connection and corresponds to the case of a configuration in which current, voltage, or potential can be supplied or transmitted. Therefore, a circuit configuration in which connection is made does not necessarily refer to a state of direct connection, and also includes, in its category, a circuit configuration in which connection is indirectly made through a circuit element such as a wiring, a resistor, a diode, or a transistor so that current, voltage and potential can be supplied or transmitted.

In this specification, even when different components are connected to each other in a circuit diagram, there is actually a case where one conductive film has functions of a plurality of components such as a case where part of a wiring serves as an electrode. The term connection in this specification also means such a case where one conductive film has functions of a plurality of components.

Furthermore, in this specification, one of a first electrode and a second electrode of a transistor refers to a source electrode and the other refers to a drain electrode.

According to one embodiment of the present invention, a flexible sensor, a flexible input device, or a flexible input/output device can be provided. According to one embodiment of the present invention, a lightweight input/output device can be provided. According to one embodiment of the present invention, a thin input device or input/output device can be provided. According to one embodiment of the present invention, an input device or input/output device with high detection sensitivity can be provided. Another object is to achieve both the small thickness and high detection sensitivity of a sensor, an input device, or an input/output device can be achieved. According to one embodiment of the present invention, a sensor that can be used for a large-sized input device or input/output device can be provided. According to one embodiment of the present invention, a large-sized input device or input/output device can be provided.

According to one embodiment of the present invention, a novel sensor that is highly convenient or reliable can be provided. A novel input device that is highly convenient or reliable can be provided. A novel input/output device that is highly convenient or reliable can be provided. A novel sensor, a novel input device, a novel input/output device, or a novel semiconductor device can be provided. Note that the descriptions of these effects do not preclude the existence of other effects. One embodiment of the present invention does not necessarily have all the effects listed above. Other effects will be apparent from and can be derived from the description of the specification, the drawings, the claims, and the like.

BRIEF DESCRIPTION OF THE DRAWINGS

In the accompanying drawings:

FIGS. 2A, 2B1, and 2B2 are a circuit diagram illustrating a configuration of a sensor and timing charts illustrating a driving method thereof according to an embodiment;

FIGS. 4A, 4B1, and 4B2 are a block diagram illustrating a configuration of an input device and timing charts illustrating a driving method thereof according to an embodiment;

FIG. 5 is a projection view illustrating a structure of an input device according to an embodiment;

FIGS. 8A1, 8A2, 8A3, 8B1, 8B2, 8C1, and 8C2 are each a projection view illustrating a structure of a data processing device according to an embodiment.

DETAILED DESCRIPTION OF THE INVENTION

Figure 1A:
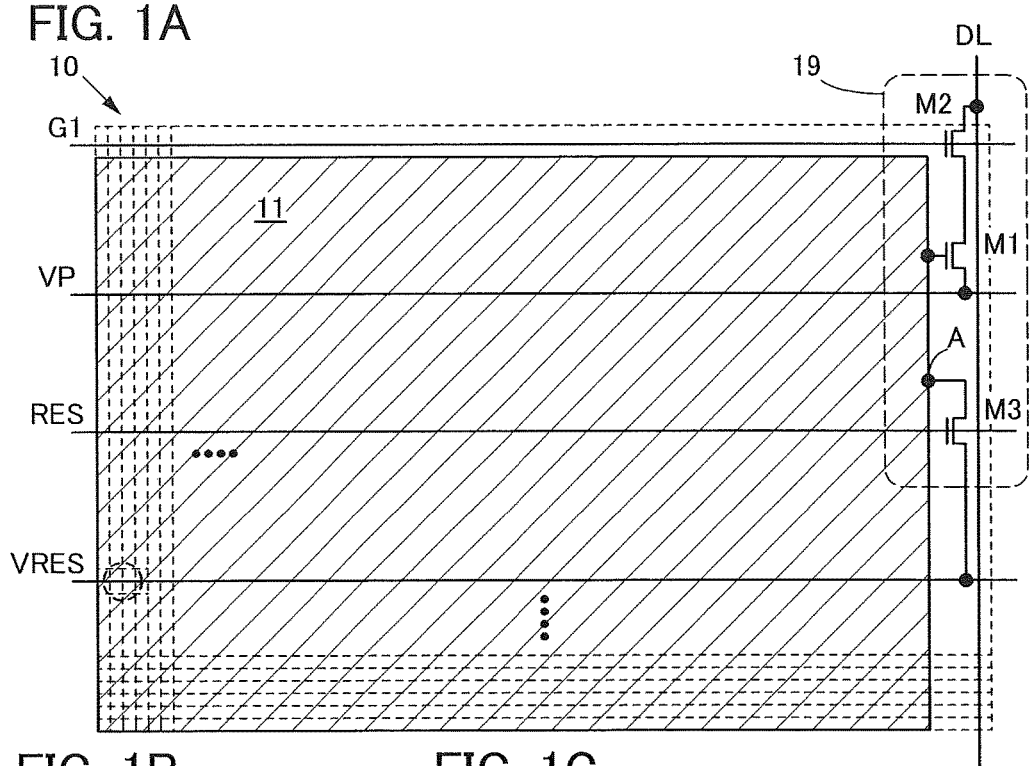
FIGS. 1A to 1D illustrate a structure of a sensor according to an embodiment.

A sensor of one embodiment of the present invention includes a window portion which transmits visible light, a light-transmitting sensor element which includes an insulating layer and a pair of electrodes between which the insulating layer is interposed and overlaps with the window portion, a sensor circuit which supplies a sensor signal on the basis of a change in the capacitance of the sensor element, and a flexible base layer supporting the sensor element and the sensor circuit.

In the sensor circuit in the sensor, one of a source and a drain of a first transistor and a second electrode of the sensor element are electrically connected to a wiring through which a control signal capable of controlling the potential of the second electrode of the sensor element can be supplied. The sensor circuit includes first to third transistors. A gate of the first transistor is electrically connected to one of a source and a drain of the third transistor and to a first electrode of the sensor element. One of the source and the drain of the first transistor is electrically connected to a second electrode of the sensor element and to a first wiring through which the control signal capable of controlling the potential of the second electrode of the sensor element can be supplied. The other of the source and the drain of the first transistor is electrically connected to one of a source and a drain of the second transistor. A gate of the second transistor is electrically connected to a second wiring through which a selection signal can be supplied. The other of the source and the drain of the second transistor is electrically connected to a third wiring through which a sensor signal can be supplied. A gate of the third transistor is electrically connected to a fourth wiring through which a reset signal can be supplied. The other of the source and the drain of the third transistor is electrically connected to a fifth wiring through which a ground potential can be supplied.

Thus, the sensor can supply the sensor signal based on a change in the capacitance of the sensor element, can transmit visible light, and can be bent. Consequently, a sensor, an input device, or an input/output device which is novel and highly convenient or reliable can be provided. Note that in this specification, the capacitance of the sensor element may include the parasitic capacitance of the sensor element.

Embodiments will be described in detail with reference to the accompanying drawings. Note that the present invention is not limited to the description below, and it is easily understood by those skilled in the art that various changes and modifications can be made without departing from the spirit and scope of the present invention. Therefore, the present invention should not be construed as being limited to the description in the following embodiments.

Note that in the structures of the invention described below, the same portions or portions having similar functions are denoted by the same reference numerals in different drawings, and description of such portions is not repeated.

Embodiment 1

In this embodiment, a structure of a sensor of one embodiment of the present invention is described with reference to FIGS. 1A to 1D and FIGS. 2A to 2B2.

FIGS. 1A to 1D illustrate a structure of a sensor 10 of one embodiment of the present invention.

FIGS. 2A to 2B2 illustrate a driving method of the sensor 10 of one embodiment of the present invention.

<Structure Example of Sensor>

A structure of the sensor of one embodiment of the present invention is described with reference to FIGS. 1A to 1D.

FIG. 1A illustrates a schematic diagram and a circuit diagram of a bottom of the sensor 10 of one embodiment of the present invention. Note that the broken lines and black dots regularly arranged in the figure indicate that repeated arrangement of a rectangle region is omitted.

Figure 1B:
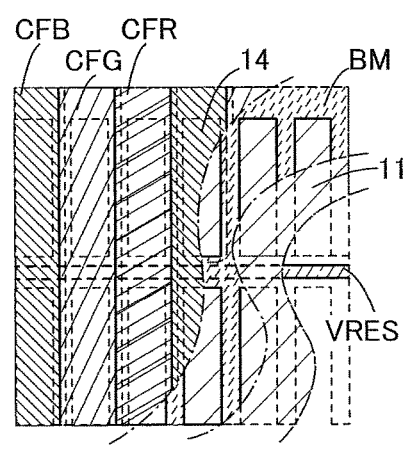

FIG. 1B is a detailed bottom view of a region of a portion enclosed by a broken-line in FIG. 1A.

Figure 1C:
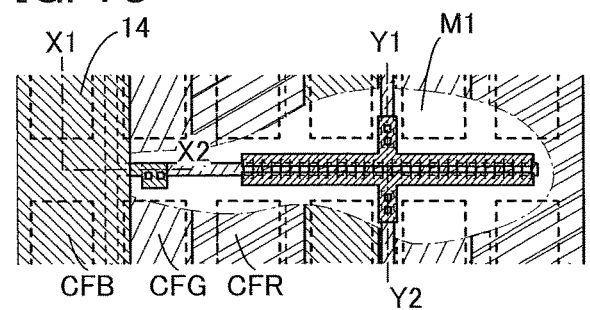

FIG. 1C is a bottom view of a portion including a transistor M1 denoted by the symbol in FIG. 1A.

Figure 1D:
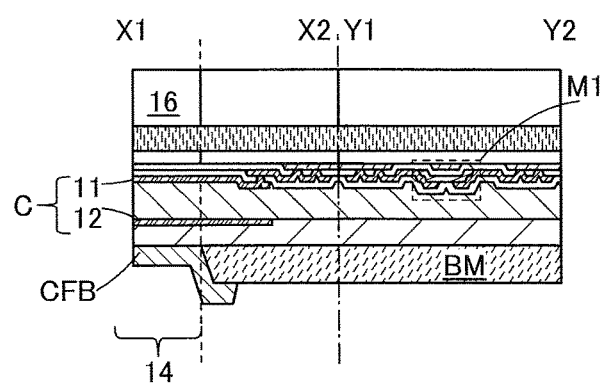

FIG. 1D is a cross-sectional view illustrating structures of cross sections along the cutting plane line X1-X2 and the cutting plane line Y1-Y2 shown in FIG. 1C.

The sensor 10 described in this embodiment includes the window portion 14 transmitting visible light, a coloring layer which overlaps with the window portion 14 and transmits light of a predetermined color, a light-blocking layer BM surrounding the window portion 14, the sensor element C overlapping with the window portion 14, the sensor circuit 19 which overlaps with the light-blocking layer BM and is electrically connected to the sensor element C, and the flexible base layer 16 which supports the sensor element C and the sensor circuit 19 (see FIGS. 1A to 1D).

In addition, the sensor element C includes an insulating layer, and the first electrode 11 and the second electrode 12 between which the insulating layer is interposed.

The sensor circuit 19 supplies a sensor signal DATA on the basis of a change in the capacitance of the sensor element C.

Furthermore, the sensor circuit 19 may include the first transistor M1 comprising a gate electrically connected to the first electrode 11 of the sensor element C and a first electrode electrically connected to a wiring VP through which, for example, a control signal capable of controlling the potential of the second electrode 12 of the sensor element C can be supplied (see FIG. 1A).

The sensor circuit may further include a second transistor M2 comprising a gate electrically connected to a scan line G1 through which a selection signal can be supplied, a first electrode electrically connected to a second electrode of the first transistor M1, and a second electrode electrically connected to a signal line DL through which, for example, the sensor signal DATA can be supplied.

The sensor circuit may further include a third transistor M3 comprising a gate electrically connected to a wiring RES through which a reset signal can be supplied, a first electrode electrically connected to the first electrode 11 of the sensor element C, and a second electrode electrically connected to a wiring VRES through which, for example, a ground potential can be supplied.

Furthermore, the wiring VP, which is electrically connected to the second electrode 12 of the sensor element C and through which the control signal capable of controlling the potential of the second electrode 12 of the sensor element C can be supplied, may be provided.

Note that in this specification, the wiring VP may be referred to as a first wiring, the scan line G1 may be referred to as a second wiring, the signal line DL may be referred to as a third wiring, the wiring RES may be referred to as a fourth wiring, and the wiring VRES may be referred to as a fifth wiring.

The sensor 10 described in this embodiment includes the window portion 14, the coloring layer which overlaps with the window portion 14 and transmits light of a predetermined color, the light-blocking layer BM surrounding the window portion 14, the light-transmitting sensor element C which includes the insulating layer and the pair of electrodes between which the insulating layer is interposed and overlaps with the window portion 14, the sensor circuit 19 which overlaps with the light-blocking layer BM and supplies the sensor signal DATA on the basis of a change in the capacitance of the sensor element C, and the flexible base layer 16 supporting the sensor element C and the sensor circuit 19.

Note that the capacitance of the sensor element C is changed when an object gets close to the first electrode 11 or the second electrode 12 or when the distance between the first electrode 11 and the second electrode 12 is changed, for example. Thus, the sensor 10 can supply the sensor signal DATA based on a change in the capacitance of the sensor element C, can transmit visible light, and can be bent. Consequently, a novel sensor that is highly convenient or reliable can be provided.

Note that through the wiring VRES, for example, a ground potential can be supplied.

Through the wiring RES, a reset signal can be supplied. Through the scan line G1, a selection signal can be supplied. Through the wiring VP, a control signal which controls the potential of the second electrode 12 of the sensor element C can be supplied.

Through the signal line DL, the sensor signal DATA can be supplied, and through a terminal OUT, a signal converted based on the sensor signal DATA can be supplied.

In the sensor 10 described in this embodiment, the second electrode 12 of the sensor element C and the second electrode of the first transistor M1 are electrically connected to the wiring VP. Even in the case where noise enters the wiring VP, for example, a difference between the potential of the signal supplied to the wiring VP and the potential of the first electrode 11 of the sensor element C (a potential difference between the electrodes of the sensor element C) can be kept constant more easily than in the structure of a sensor circuit in which the second electrode 12 of the sensor element C and the second electrode of the first transistor M1 are connected to different wirings. Accordingly, a change in the capacitance of the sensor element C due to noise can be reduced, and interference with the sensor signal DATA due to noise can be reduced. Specifically, the structure contributes to a reduction in noise.

Individual components forming the sensor 10 are described below. Note that these components cannot be clearly distinguished and one component also serves as another component or includes part of another component in some cases.

<<Window Portion, Coloring Layer, and Light-Blocking Layer>>

The window portion 14 transmits visible light.

The coloring layer transmitting light of a predetermined color is provided at a position overlapping with windows portion 14. For example, a coloring layer CFB transmitting blue light, a coloring layer CFG, or a coloring layer CFR is provided (see FIGS. 1B to 1D).

Note that, in addition to the coloring layers transmitting blue light, green light, and/or red light, coloring layers transmitting light of various colors such as a coloring layer transmitting white light or a coloring layer transmitting yellow light can be provided.

For the coloring layers, metal materials, pigment, dyes, or the like can be used.

Note that a light-transmitting overcoat layer covering the coloring layer and the light-blocking layer BM can be provided.

The light-blocking layer BM surrounding the window portion 14 is provided. The light-blocking layer BM transmits light less easily than the window portion 14.

For the light-blocking layer BM, carbon black, a metal oxide, a composite oxide containing a solid solution of a plurality of metal oxides, or the like can be used.

<<Sensor Circuit and Wirings>>

The sensor circuit 19 and the wirings are preferably provided at positions overlapping with the light-blocking layer BM.

A transistor that can be formed in the same process as the first transistor M1 can be used as the second transistor M2 and the third transistor M3.

Furthermore, in the case where the wirings are placed so as to overlap with the light-blocking layer BM, a material that does not easily transmit visible light can be used as the wirings. For example, a material having more excellent conductivity than a conductive film having a light-transmitting property can be used. Specifically, a metal can be used.

The base layer 16 may be provided with the sensor circuit 19 by processing a film formed on the base layer 16.

Alternatively, the sensor circuit 19 formed over another base layer may be transferred to the base layer 16.

<Driving Method of Sensor>

A driving method of the sensor 10 described in this embodiment is described with reference to FIGS. 2A to 2B2.

FIG. 2A is a circuit diagram illustrating a configuration of the sensor 10 of one embodiment of the present invention and a converter CONY, and FIGS. 2B1 and 2B2 are timing charts illustrating the driving method.

As the converter CONY, various circuits that can convert the sensor signal DATA and supply the converted signal to the terminal OUT can be used. For example, a source follower circuit, a current mirror circuit, or the like may be formed by the electrical connection between the converter CONY and the sensor circuit 19.

Specifically, a source follower circuit can be formed using the converter CONY including a transistor M4 (see FIG. 2A).

As the transistor M4, a transistor that can be formed in the same process as the first transistor M1 to the third transistor M3 may be used.

<<First Step>>

In a first step, the reset signal that turns on the third transistor M3 and then turns it off is supplied to the gate of the third transistor M3, so that the potential of the first electrode 11 of the sensor element C is set to a predetermined potential (see a period T1 in FIG. 2B1).

Specifically, the wiring RES is made to supply the reset signal. The third transistor M3 to which the reset signal is supplied can set the potential of the node A to the ground potential, for example (see FIG. 2A).

<<Second Step>>

In a second step, the control signal is supplied to the second electrode 12 of the sensor element C, and the control signal and a potential that varies depending on the capacitance of the sensor element C are supplied to the gate of the first transistor M1.

Specifically, the wiring VP is made to supply the control signal. The sensor element C whose second electrode 12 is supplied with the control signal increases the potential of the node A on the basis of the capacitance of the sensor element C (see a period T2 in FIG. 2B1).

<<Third Step>>

In a third step, a selection signal that turns on the second transistor M2 is supplied to the gate of the second transistor M2, and the second electrode of the first transistor M1 is electrically connected to the signal line DL.

Specifically, the scan line G1 is made to supply the selection signal. Through the second transistor M2 to which the selection signal is supplied, the second electrode of the first transistor M1 is electrically connected to the signal line DL (see a period T3 in FIG. 2B1).

For example, in the case where the sensor element is put in the air, when an object having a higher dielectric constant than the air is placed in the proximity of the first electrode 11 or the second electrode 12 of the sensor element C, the apparent capacitance of the sensor element C is increased.

Thus, a change in the potential of the node A due to the control signal is reduced as compared with the case where an object having a higher dielectric constant than the air is not placed in the proximity (see a solid line in FIG. 2B2).

<<Fourth Step>>

In a fourth step, the sensor circuit supplies the sensor signal based on a change in the potential of the gate of the first transistor M1 is supplied to the signal line DL. Note that the above signal has a function as the sensor signal. Thus, the sensor circuit supplies the sensor signal on the basis of the potential of the gate of the first transistor.

For example, a change in current due to a change in the potential of the gate of the first transistor M1 is supplied to the signal line DL.

The converter CONY converts a change in current flowing through the signal line DL into a voltage change and supplies the voltage change.

<<Fifth Step>>

In a fifth step, the selection signal that turns off the second transistor is supplied to the gate of the second transistor.

This embodiment can be combined with another embodiment in this specification as appropriate.

Embodiment 2

In this embodiment, a structure of an input device of one embodiment of the present invention is described with reference to FIGS. 3A and 3B and FIGS. 4A to 4B2.

Figure 3A:
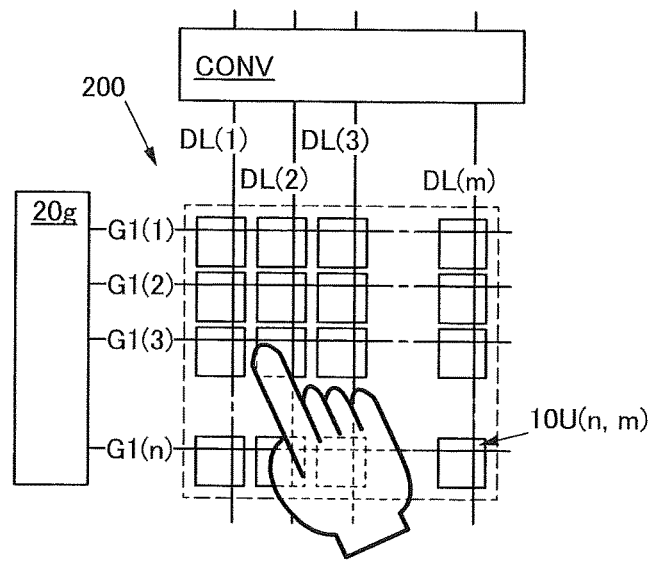
FIGS. 3A and 3B illustrate a structure of an input device according to an embodiment.
Figure 3B:
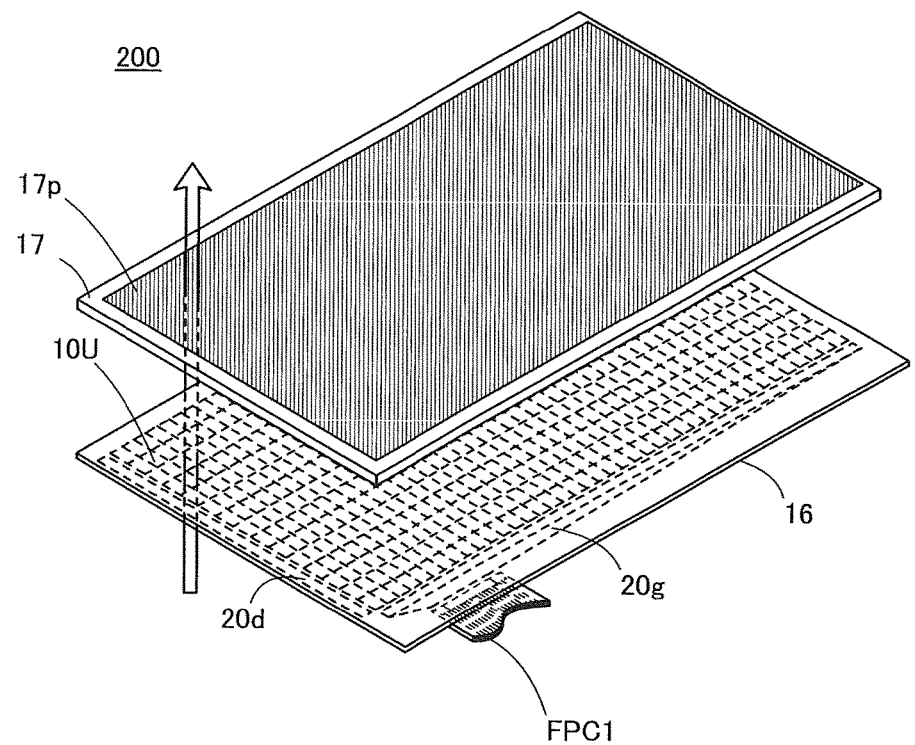

FIGS. 3A and 3B illustrate a structure of an input device 200 of one embodiment of the present invention.

FIGS. 4A to 4B2 illustrate a driving method of the input device 200 of one embodiment of the present invention.

FIG. 3A is a block diagram illustrating the structure of the input device 200, and FIG. 3B is a projection view illustrating the appearance of the input device 200.

Note that the input device 200 can also be referred to as a touch sensor.

<Structure Example of Input Device>

The input device 200 described in this embodiment includes a plurality of sensor units 10U arranged in a matrix, scan lines G1 to which the plurality of sensor units 10U placed along the row direction are electrically connected, signal lines DL to which the plurality of sensor units 10U placed along the column direction are electrically connected, and the flexible base layer 16 provided with the sensor units 10U, the scan lines G1, and the signal lines DL (see FIGS. 3A and 3B).

For example, the plurality of sensor units 10U can be arranged in a matrix of n rows and in columns (n and m are natural numbers greater than or equal to 1).

Note that the sensor unit 10U provided in the i-th row and the j-th column (i is a natural number greater than or equal to 1 and less than or equal to n, and j is a natural number greater than or equal to 1 and less than or equal to in) is referred to as a sensor unit 10U(i, j). Furthermore, the scan line G1 provided in the i-th row is referred to as a scan line G1(i), and the signal line DL provided in the j-th column is referred to as a signal line DL(j).

Then, the sensor unit 10U includes the window portion 14 (not illustrated) transmitting visible light, the sensor element C overlapping with the window portion 14, and the sensor circuit 19 (not illustrated) electrically connected to the sensor element C.

For example, a structure similar to that of the sensor 10 described in Embodiment 1 can be used as the sensor unit 10U (see FIGS. 1A to 1D).

The sensor element C includes the insulating layer, and the first electrode 11 and the second electrode 12 between which the insulating layer is interposed.

The sensor circuit 19 is supplied with the selection signal and supplies the sensor signal on the basis of a change in the capacitance of the sensor element C.

The selection signal can be supplied through the scan line G1. The sensor signal can be supplied through the signal line DL.

Furthermore, the sensor circuit 19 may include the first transistor M1 comprising a gate electrically connected to the first electrode 11 of the sensor element C and a first electrode electrically connected to the wiring VP through which, for example, a control signal controlling the potential of the second electrode 12 of the sensor element C can be supplied (see FIG. 2A).

The structure may be employed in which the second electrode 12 of the sensor element C and the second electrode of the first transistor M1 are electrically connected to the wiring VP. Even in the case where noise enters the wiring VP, for example, a difference between the potential of the signal supplied to the wiring VP and the potential of the first electrode 11 of the sensor element C (a potential difference between the electrodes of the sensor element C) can be kept constant more easily in this structure than in the structure of a sensor circuit in which the second electrode 12 of the sensor element C and the second electrode of the first transistor M1 are connected to different wirings. Accordingly, a change in the capacitance of the sensor element C due to noise can be reduced, and interference with the sensor signal DATA due to noise can be reduced. Specifically, the structure contributes to a reduction in noise.

The sensor circuit may further include the second transistor M2 comprising a gate electrically connected to the scan line G1 through which the selection signal can be supplied, a first electrode electrically connected to the second electrode of the first transistor M1, and a second electrode electrically connected to the signal line DL through which, for example, the sensor signal DATA can be supplied.

The sensor circuit may further include the third transistor M3 comprising a gate electrically connected to the wiring RES through which the reset signal can be supplied, a first electrode electrically connected to the first electrode 11 of the sensor element C, and a second electrode electrically connected to the wiring VRES through which, for example, the ground potential can be supplied.

The input device 200 described in this embodiment includes the sensor units 10U which are arranged in a matrix and include the window portions which transmit visible light, the light-transmitting sensor elements C which include the insulating layer and the pair of electrodes between which the insulating layer is interposed and overlap with the window portions, and the sensor circuits which supply the sensor signal on the basis of a change in the capacitance of the sensor element C, and the flexible base layer 16 supporting the sensor units 10U. The input device 200 can further include a flexible protective base layer 17 and/or a protective layer 17p (see FIG. 3B). The flexible protective base layer 17 or the protective layer 17p can prevent the input device 200 from being scratched.

The capacitance of the sensor element C is changed when an object gets close to the first electrode 11 or second electrode 12 of the sensor element C or when the distance between the first electrode 11 and the second electrode 12 of the sensor element C is changed, for example. Thus, the input device can supply positional information of a sensor unit and a sensor signal detected by the sensor unit, can transmit visible light, and can be bent. Consequently, a novel input device that is highly convenient or reliable can be provided.

In the input device 200, the areas of the second electrodes 12 of the sensor elements C are 10 times or more, preferably 20 times or more as large as the sum of the areas of the first electrodes 11 included in the plurality of sensor elements C electrically connected to one signal line.

In the input device 200 described in this embodiment, one sensor unit 10U can be selected from the plurality of sensor units 10U connected to one signal line DL by using the selection signal, and the first electrode 11 having a sufficiently smaller area than the second electrode 12 is provided.

Thus, the capacitance which is derived from the sensor unit that is selected can be separated from the capacitance which is derived from the sensor unit that is not selected. Furthermore, a sensor unit whose first electrode has a small area is placed, so that positional data can be acquired in detail. In addition, the first electrode does not easily get much noise. Consequently, a novel input device that is highly convenient or reliable can be provided.

The input device 200 may include a driver circuit 20g which can supply selection signals at predetermined timings. For example, the driver circuit 20g supplies selection signals to the scan lines in a predetermined order.

The input device 200 may include the converter CONY which converts the sensor signal DATA supplied from the sensor unit 10U. The converter CONV includes a plurality of converters CONV(1) to CONV(m). For example, the converter CONV(j) may convert the sensor signal DATA supplied through the signal line DL(j) (j is a natural number greater than or equal to 1 and less than or equal to in) and supply the converted signal.

The input device 200 may be electrically connected to a flexible printed circuit FPC. For example, the flexible printed circuit FPC may supply various potentials such as a power supply potential, various timing signals, or the like and may be supplied with a signal based on the sensor signal DATA.

Note that the input device described in this embodiment is different from the sensor 10 described with reference to FIGS. 1A to 1D in Embodiment 1 in including the plurality of sensor units 10U having the same structure as the sensor 10 described in Embodiment 1 which are provided in a matrix over the base layer 16, including the plurality of scan lines G1 to which the plurality of sensor units 10U placed along the row direction are electrically connected, and including the signal lines DL to which the plurality of sensor units 10U placed along the column direction are electrically connected, and in that the first electrode 11 of the sensor unit 10U is sufficiently smaller than the second electrode 12. Different structures are described in detail here. Refer to the above-described description for the part where the same structures can be employed.

Individual components forming the input device 200 are described below. Note that these components cannot be clearly distinguished and one component also serves as another component or includes part of another component in some cases.

<<Overall Structure>>

The input device 200 includes the plurality of sensor units 10U, the scan lines G1, and the signal lines DL.

The input device 200 may further include the driver circuit 20g and a driver circuit 20d.

The sensor circuits 19 of the plurality of sensor units 10U and the driver circuits 20g and 20d can be configured using transistors formed in the same process.

<<Scan Lines and Signal Lines>>

The scan lines G1 and the signal lines DL are preferably placed at positions overlapping with the light-blocking layer BM of the sensor units 10U.

The base layer 16 may be provided with the plurality of sensor units 10U arranged in a stripe pattern, a mosaic pattern, a delta pattern, a honeycomb pattern, or a Bayer pattern.

<<Driver Circuit 20g>>

The driver circuit 20g can be configured with a logic circuit using a variety of combinational circuits. For example, a shift register can be used.

<<Driver Circuit 20d>>

The driver circuit 20d includes the convertor CONY provided with a converter circuit. As the convertor CONY, any of a variety of circuits that can convert the sensor signal DATA and supply the converted signal can be used. For example, a source follower circuit, a current mirror circuit, or the like may be formed by the electrical connection between the converter CONY and the sensor circuit 19.

<Driving Method of Input Device>

A driving method of the input device 200 described in this embodiment is described with reference to FIGS. 4A to 4B2.

FIG. 4A is a block diagram illustrating a configuration of the input device 200, and FIG. 4B is a timing chart illustrating the driving method of the input device 200.

Through the wiring VRES, for example, the ground potential can be supplied, and through a wiring VPO and a wiring BR, for example, a high power supply potential can be supplied.

In addition, through the wiring RES, the reset signal can be supplied. Through the scan line G1, the selection signal can be supplied. Through the wiring VP, the control signal can be supplied.

Furthermore, through the signal line DL, the sensor signal DATA can be supplied, and through a terminal OUT(j), a signal converted based on the sensor signal DATA can be supplied.

The driving method of the input device 200 described in this embodiment is different from the driving method of the sensor 10 described with reference to FIGS. 2A to 2B2 in that one scan line G1(i) supplies the selection signals to the plurality of sensor units 10U at the same timing and in that the plurality of terminals OUT(1) to OUT(m) supply signals converted based on the sensor signal DATA at the same timing. Such different steps are described in detail here. Refer to the above-described description for the part where the same steps can be employed.

<<First Step>>

In a first step, the reset signal is supplied, and the potentials of the first electrodes 11 of the sensor elements C of all the sensor units 10U are set to a predetermined potential (see FIG. 2A and a period T1 in FIG. 4B1). For example, the potentials of the first electrodes 11 of the sensor elements C are set to the ground potential.

Furthermore, for example, the value of i is set to 1 such that predetermined scan lines are selected in order. Note that the time when the value of i is 1 can be referred to as commencement time of an input frame period.

<<Second Step>>

In a second step, a predetermined control signal is supplied to the second electrode 12 of the sensor element C, and the control signal and a potential that varies based on the capacitance of the sensor element C are supplied to the gate of the first transistor M1.

Note that a signal synchronizing with the selection signal can be used as the control signal.

<<Third Step>>

In a third step, the scan line G1($i$) is selected, and the selection signal is supplied to sensor units 10U(i, 1) to 10U(i, in) electrically connected to the selected scan line G1($i$) during a predetermined period.

The second electrode of the first transistor M1 supplied with the selection signal is electrically connected to signal lines DL(1) to DL(m) (see FIG. 2A and a period T3 in FIG. 4B1).

The sensor element C whose second electrode 12 is supplied with the rectangular wave control signal increases the potential of the node A on the basis of the capacitance of the sensor element C (see the period T2 in FIG. 2B 1).

<<Fourth Step>>

In a fourth step, a current that varies based on a change in the potential of the gate of the first transistor M1 is supplied to the signal line DL. Note that the above current has a function as the sensor signal. Thus, the sensor circuit supplies the sensor signal on the basis of the potential of the gate of the first transistor.

The converter CONY converts a change in current flowing through the signal line DL into a voltage change and supplies the voltage change.

<<Fifth Step>>

In a fifth step, the selection signal that turns off the second transistor is supplied to the gate of the second transistor.

<<Sixth Step>>

In a sixth step, 1 is added to the value of i, and when the obtained value is n or less, the method moves to the second step.

Specifically, in the case where the value of i is less than n, in the second step, a scan line G1($i$+1) is selected, and the selection signal is supplied to sensor units 10U(i+1, 1) to 10U(i+1, m) electrically connected to a selected scan line G1($i$+1) during a predetermined period.

The second electrode of the first transistor M1 supplied with the selection signal is electrically connected to the signal lines DL(1) to DL(in) (see FIG. 2A and the period T3 in FIG. 4B1).

When the value obtained by adding 1 to the value of i is more than n, the method moves to the first step. Furthermore, the time when the value obtained by adding 1 to the value of i is more than n can be referred to as termination time of the input frame period.

According to this driving method, all the sensor units supply the sensor signal DATA every input frame period.

For example, the sensor signal DATA contains positional data of an object in the proximity of each sensor unit. In addition, positional data of the sensor units placed in a matrix in advance is known.

By associating the sensor signal DATA with the positional data of the sensor units, the input device 200 can supply the positional data of the object in the proximity of the input device 200 every input frame period.

Specifically, the sensor signal DATA and the positional data of the sensor unit are analyzed using an arithmetic device, so that the positional data of the object in the proximity of the input device 200 can be known every input frame period.

In the above-described driving method, a signal obtained by inverting the potential of the control signal supplied to the second electrode 12 of the sensor element C can be used as the control signal (see FIG. 4B2).

This embodiment can be combined with any of the other embodiments in this specification as appropriate.

Embodiment 3

In this embodiment, a structure of an input/output device that can be used for a data processing device of one embodiment of the present invention is described with reference to FIG. 5 and FIGS. 6A to 6C.

FIG. 5 is a projection view illustrating a structure of an input/output device 500TP of one embodiment of the present invention. Note that in the figure, some of the sensor units 10U and some of the pixels 502 are enlarged for convenience of illustration.

Figure 6A:
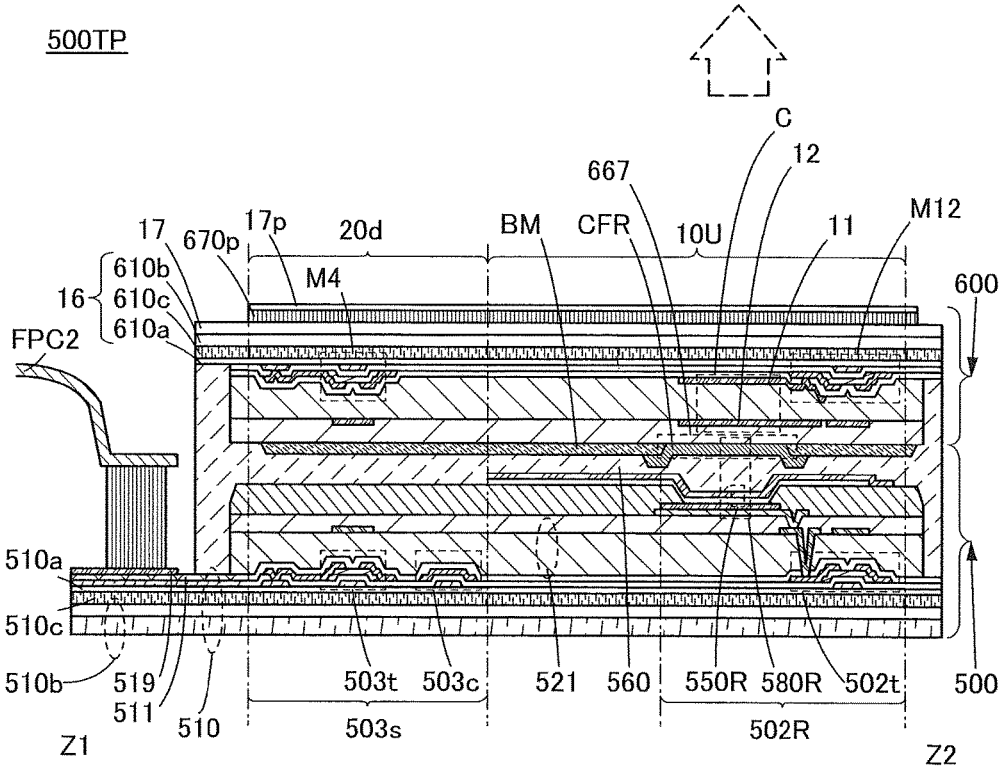
FIGS. 6A to 6C are cross-sectional views illustrating structures of an input device according to an embodiment.
Figure 6B:
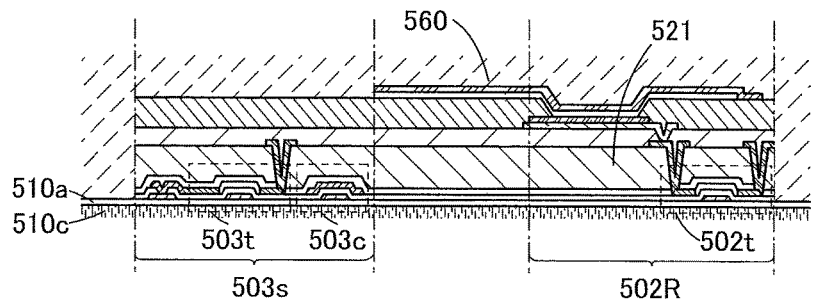
Figure 6C:
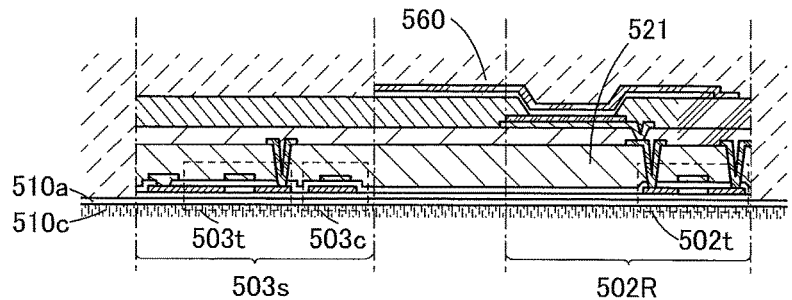

FIG. 6A is a cross-sectional view illustrating a cross-sectional structure of the input/output device 500TP of one embodiment of the present invention along the line Z1-Z2 in FIG. 5. FIGS. 6B and 6C are each a cross-sectional view illustrating a modification example of a replaceable structure which is part of the structure in FIG. 6A.

<Structure Example of Input/Output Device>

The input/output device 500TP described in this embodiment includes a display portion 500 and an input device 600 overlapping with the display portion 500 (see FIG. 5).

The input device 600 includes the plurality of sensor units 10U arranged in a matrix.

The input device 600 further includes the scan line G1, the wiring VP, the wiring RES, the wiring VRES, and the like to which a plurality of sensor units 10U placed along a row direction (indicated by the arrow R in the figure) are electrically connected.

The input device 600 further includes the signal line DL and the like to which a plurality of sensor units 10U placed along a column direction (indicated by the arrow C in the figure) are electrically connected.

The sensor unit 10U includes the sensor circuit 19. The sensor circuit 19 is electrically connected to the scan line G1, the wiring VP, the wiring RES, the wiring VRES, the signal line. DL, and the like.

In the sensor circuit, a transistor, a sensor element, and/or the like can be used. For example, a conductive film and a capacitor electrically connected to the conductive film can be used in the sensor element. A capacitor and a transistor electrically connected to the capacitor can be used.

The sensor element C including the insulating layer, and the first electrode 11 and the second electrode 12 between which the insulating layer is interposed can be used (see FIG. 6A).

The sensor circuit 19 is supplied with the selection signal, and supplies the sensor signal DATA on the basis of a change in the capacitance of the sensor element C.

The selection signal can be supplied through the scan line G1. The sensor signal DATA can be supplied through the signal line DL.

Furthermore, the sensor unit includes a plurality of window portions 667 arranged in a matrix. The window portions 667 transmit visible light. The light-blocking layer BM may be provided between the window portions 667.

A coloring layer is provided at a position overlapping the window portion 667. The coloring layer transmits light of a predetermined color. Note that the coloring layer may be referred to as a color filter. For example, a coloring layer CFB which transmits blue light, a coloring layer CFG which transmits green light, or a coloring layer CFR which transmits red light can be used. Furthermore, a coloring layer that transmits yellow light or a layer that transmits white light may be used.

The display portion 500 includes the plurality of pixels 502 arranged in a matrix. The pixels 502 are placed so as to overlap with the window portions 667 of the input device 600. The pixels 502 may be arranged at higher density than the sensor units 10U.

The input/output device 500TP described in this embodiment includes the input device 600 including the plurality of sensor units 10U which are arranged in a matrix and provided with the window portions 667 transmitting visible light, the display portion 500 including the plurality of pixels 502 overlapping with the window portions 667, and the coloring layer between the window portion 667 and the pixel 502.

Furthermore, each sensor unit is provided with a switch capable of reducing electrical interference with another sensor unit. Note that a transistor or the like can be used as the switch.

Thus, sensor information obtained by each sensor unit can be supplied together with the positional information of the sensor unit. In addition, the sensor information associated with the positional information of pixels for displaying an image can be supplied.

In addition, the sensor unit which does not supply the sensor information is not electrically connected to the signal line, whereby electrical interference with the sensor unit which supplies the sensor signal can be reduced. Thus, the novel input/output device 5001P can be highly convenient or reliable.

For example, the input device 600 of the input/output device 500'1P can sense sensor information and supplies the sensor information together with the positional information. Specifically, a user of the input/output device 500TP can make various gestures (e.g., tap, drag, swipe, and pinch in) using his/her finger or the like as a pointer on the input device 600.

The input device 600 is capable of sensing approach or contact of a finger or the like to the input device 600 and supplying sensor information including the obtained position, track, or the like.

The arithmetic device judges whether or not supplied information satisfies a predetermined condition on the basis of a program or the like and executes instructions associated with a predetermined gesture.

Thus, a user of the input device 600 can make the predetermined gesture with his/her finger and make the arithmetic device execute instructions associated with the predetermined gesture.

For example, the input device 600 of the input/output device 500TP is capable of selecting one of a plurality of sensor units that can supply sensor information to a signal line to cause a non-conduction state between the signal line and all sensor units except the selected one. Therefore, interference of the sensor units that are not selected with the selected sensor unit can be reduced.

Specifically, interference of the sensor elements of the sensor units that are not selected with the sensor element of the selected sensor unit can be reduced.

For example, in the case where a capacitor and a conductive film to which one electrode of the capacitor is electrically connected are used in a sensor element, interference of the potential of a conductive film of a sensor unit that is not selected with the potential of a conductive film of a selected sensor unit can be reduced. Specifically, noise can be reduced.

Thus, without dependence on the size, the input/output device 5001P can drive the sensor units and supply sensor information. For example, it is possible to provide the input/output devices 500TP having various sizes, ranging from the one which can be used for a handheld type device to the one which can be used for an electric blackboard.

The input/output device 500TP can be folded and unfolded. Even in the case where electrical interference with the selected sensor unit, which is caused by the non-selected sensor units, is different between the input/output device 500TP in the folded state and the input/output device 500TP in the unfolded state, the input/output device 500TP can drive the sensor unit and supply the sensor information without depending on the state of the input/output device 500TP.

Furthermore, display information V can be supplied to the display portion 500 of the input/output device 500TP. For example, the arithmetic device can supply the display information V.

In addition to the above structure, the following structure can be included in the input/output device 500TP.

The input device 600 of the input/output device 500TP may include a driver circuit 20g and a driver circuit 20d. The input device 600 may be electrically connected to a flexible printed circuit FPC1.

The display portion 500 of the input/output device 500TP may include a driver circuit 503g, a driver circuit 503s, a wiring 511, or a terminal 519. The display portion 500 may be electrically connected to a flexible printed circuit FPC2.

In addition, the protective layer 17p which protects the input/output device 500TP by preventing it from being scratched may be provided. For example, a ceramic coat layer or a hard coat layer can be used as the protective layer 17p. Specifically, a layer containing aluminum oxide or a layer containing a UV curable resin can be used. Furthermore, an antireflective layer 670p weakening the intensity of external light which is reflected by the input/output device 500TP can be used. Specifically, a circularly polarizing plate can be used, for example.

Individual components forming the input/output device 500TP are described below. Note that these units cannot be clearly distinguished and one unit also serves as another unit or include part of another unit in some cases.

For example, the input device 600 provided with the coloring layers overlapping with the plurality of window portions 667 serves not only as the input device 600 but also as color filters.

Furthermore, for example, the input/output device 500TP in which the input device 600 overlaps with the display portion 500 serves not only as the input device 600 but also as the display portion 500. Note that the input/output device 500TP in which the input device 600 overlaps with the display portion 500 is also referred to as a touch panel.

<<Overall Structure>>

The input/output device 500TP described in this embodiment includes the input device 600 and the display portion 500.

<<Input Device>>

The input device 600 includes the sensor units 10U, the scan lines G1, the signal lines DL, and the base layer 16.

Note that the input device 600 may be formed in such a manner that a film for forming the input device 600 is formed over the base layer 16 and processed.

Alternatively, the input device 600 may be formed in such a manner that part of the input device 600 is formed over another base layer and transferred to the base layer 16.

<<Sensor Unit>>

The sensor unit 10U senses an object approaching or touching the sensor unit 10U and supplies a sensor signal. For example, the sensor unit 10U senses electrostatic capacitance, illuminance, magnetic force, an electric wave, a pressure, or the like and supplies information based on the obtained physical value. Specifically, a capacitor, a photoelectric conversion element, a magnetic sensor element, a piezoelectric element, a resonator, or the like can be used as a sensor element.

The sensor unit 10U senses, for example, a change in the capacitance between the sensor unit 10U and what approaches or touches the sensor unit 10U. Specifically, a conductive film and a sensor circuit electrically connected to the conductive film may be used.

Note that when an object which has a higher dielectric constant than the air, such as a finger, approaches the conductive film in the air, electrostatic capacitance between the finger and the conductive film changes. The change in the electrostatic capacitance can be sensed, and sensor information can be supplied. Specifically, a sensor circuit including a conductive film and a capacitor, one electrode of which is connected to the conductive film, can be used for the sensor unit 10U.

For example, distribution of charge occurs between the conductive film and the capacitor owing to the change in the electrostatic capacitance, so that the voltage across the capacitor is changed. The change in voltage can be used for a sensor signal. Specifically, the voltage between the electrodes of the sensor element C changes when an object approaches the conductive film which is electrically connected to one electrode of the sensor element C. In this specification, the above-described electrostatic capacitance between the finger and the conductive film may be referred to as parasitic capacitance of the capacitor or parasitic capacitance of the sensor element. Therefore, a change in electrostatic capacitance between the finger and the conductive film may be referred to as a change in the parasitic capacitance of the capacitor or parasitic capacitance of the sensor element.

<<Switch and Transistor>>

The sensor unit 10U includes a switch which can be turned on or off on the basis of a control signal. For example, a transistor M12 can be used as the switch.

A transistor which amplifies a sensor signal can be used in the sensor unit 10U.

Transistors that can be formed by the same process can be used as the switch and the transistor which amplifies a sensor signal. Thus, the input device 600 which can be manufactured by a simplified process can be provided.

The transistor includes a semiconductor layer. For example, a Group 4 element, a compound semiconductor, or an oxide semiconductor can be used for the semiconductor layer. Specifically, a semiconductor containing silicon, a semiconductor containing gallium arsenide, an oxide semiconductor containing indium, or the like can be used for the semiconductor layer. Alternatively, an organic semiconductor or the like can be used for the semiconductor layer. Examples of an organic semiconductor include acenes such as anthracene, tetracene, and pentacene, oligothiophene derivatives, phthalocyanines, perylene derivatives, rubrene, $Alq_3$, TTF-TCNQ, polythiophene (e.g., poly-3-hexylthiophene), polyacetylene, polyfluorene, polyphenylene vinylene, polypyrrole, polyaniline, pentacene, tetracyanoquinodimethane (TCNQ), polyparaphenylene vinylene (PPV), and the like.

Transistors can include semiconductor layers with a variety of crystallinity. For example, a semiconductor layer containing non-crystal, a semiconductor layer containing microcrystal, a semiconductor layer containing polycrystal, a semiconductor layer containing single crystal, and the like can be used. Specifically, a semiconductor layer containing amorphous silicon, a semiconductor layer containing polysilicon obtained by crystallization process such as laser annealing, a semiconductor layer formed by silicon on insulator (SOT) technique, and the like can be used.

The oxide semiconductor used for the semiconductor layer preferably includes a film represented by an In-M-Zn oxide that contains at least indium (In), zinc (Zn), and M (metal such as Al, Ga, Ge, Y, Zr, Sn, La, Ce, or Hf), for example. Alternatively, both In and Zn are preferably contained.

As a stabilizer, gallium (Ga), tin (Sn), hafnium (Hf), aluminum (Al), zirconium (Zr), or the like can be used. As another stabilizer, lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) can be used.

As an oxide semiconductor included in an oxide semiconductor film, any of the followings can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, and an In—Ga-based oxide.

Note that here, an In—Ga—Zn-based oxide means an oxide containing In, Ga, and Zn as its main components and there is no limitation on the ratio of In:Ga:Zn. The In—Ga—Zn-based oxide may contain another metal element in addition to In, Ga, and Zn.

<<Wiring>>

The input device 600 includes the scan lines G1, the wiring VP, the wiring RES, the wiring VRES, the signal lines DL, and the like.

A conductive material can be used for the scan lines G1, the wiring VP, the wiring RES, the wiring VRES, the signal lines DL, or the like.

For example, an inorganic conductive material, an organic conductive material, metal, conductive ceramics, or the like can be used for the wiring.

Specifically, a metal element selected from aluminum, gold, platinum, silver, chromium, tantalum, titanium, molybdenum, tungsten, nickel, iron, cobalt, yttrium, zirconium, palladium, and manganese; an alloy including any of the above metal elements; an alloy including any of the above metal elements in combination; or the like can be used for the wiring. In particular, one or more elements selected from aluminum, chromium, copper, tantalum, titanium, molybdenum, and tungsten are preferably contained. In particular, an alloy of copper and manganese is suitably used in microfabrication with the use of wet etching.

Specifically, any of the following structures can be used: a two-layer structure in which a titanium film is stacked over an aluminum film; a two-layer structure in which a titanium film is stacked over a titanium nitride film; a two-layer structure in which a tungsten film is stacked over a titanium nitride film; a two-layer structure in which a tungsten film is stacked over a tantalum nitride film or a tungsten nitride film; and a three-layer structure in which a titanium film, an aluminum film, and a titanium film are stacked in that order.

Specifically, a stacked-layer structure in which a film of an element selected from titanium, tantalum, tungsten, molybdenum, chromium, neodymium, and scandium, or an alloy film or nitride film in which a plurality of elements selected from titanium, tantalum, tungsten, molybdenum, chromium, neodymium, and scandium are combined is stacked over an aluminum film can be used.

Alternatively, a conductive oxide such as indium oxide, indium tin oxide, indium zinc oxide, zinc oxide, or zinc oxide to which gallium is added can be used.

Alternatively, graphene or graphite can be used. A film containing graphene can be formed, for example, by reducing a film containing graphene oxide. As a reducing method, a method with application of heat, a method using a reducing agent, and the like can be given.

Alternatively, a conductive high molecule can be used.

<<Driver Circuit>>

The driver circuit 20g can supply selection signals at predetermined timings, for example. Specifically, the driver circuit 20g supplies selection signals to the scan lines G1 in a predetermined order. Any of various circuits can be used as the driver circuit 20g. For example, a shift register, a flip-flop circuit, a combination circuit, or the like can be used. The driver circuit 20g may supply a selection signal to operate the input device 600 on the basis of a predetermined operation of the display portion 500. Specifically, the selection signal may be supplied to operate the input device 600 in a retrace period of the display portion 500. Thus, a problem in that the input device 600 senses noise due to the operation of the display portion 500 can be reduced.

The driver circuit 20d supplies sensor information on the basis of a sensor signal supplied by the sensor unit. Any of various circuits can be used as the driver circuit. For example, a circuit which can serve as a source follower circuit or a current mirror circuit by electrical connection with the sensor circuit provided in the sensor unit can be used as the driver circuit 20d. An analog/digital converter circuit which converts a sensor signal into a digital signal may be provided.

<<Base Layer>>

There is no particular limitation on the base layer 16 as long as the base layer 16 has heat resistance high enough to withstand a manufacturing process and a thickness and a size which can be used in a manufacturing apparatus. In particular, use of a flexible material as the base layer 16 enables the input device 600 to be folded or unfolded. Note that in the case where the input device 600 is positioned on a side where the display portion 500 displays an image, a light-transmitting material is used as the base layer 16.

For the base layer 16, an organic material, an inorganic material, a composite material of an organic material and an inorganic material, or the like can be used.

For example, an inorganic material such as glass, a ceramic, or a metal can be used for the base layer 16.

Specifically, non-alkali glass, soda-lime glass, potash glass, crystal glass, or the like can be used for the base layer 16.

Specifically, a metal oxide film, a metal nitride film, a metal oxynitride film, or the like can be used for the base layer 16. For example, silicon oxide, silicon nitride, silicon oxynitride, an alumina film, or the like can be used for the base layer 16.

For example, an organic material such as a resin, a resin film, or plastic can be used for the base layer 16.

Specifically, a resin film or resin plate of polyester, polyolefin, polyamide, polyimide, polycarbonate, an acrylic resin, or the like can be used for the base layer 16.

For example, a composite material such as a resin film to which a thin glass plate or a film of an inorganic material is attached can be used as the base layer 16.

For example, a composite material formed by dispersing a fibrous or particulate metal, glass, inorganic material, or the like into a resin film can be used as the base layer 16.

For example, a composite material formed by dispersing a fibrous or particulate resin, organic material, or the like into an inorganic material can be used as the base layer 16.

A single-layer material or a stacked-layer material in which a plurality of layers are stacked can be used for the base layer 16. For example, a stacked-layer material including a base layer and an insulating layer that prevents diffusion of impurities contained in the base layer can be used for the base layer 16.

Specifically, a stacked-layer material in which glass and one or a plurality of films that prevent diffusion of impurities contained in the glass and that are selected from a silicon oxide film, a silicon nitride film, a silicon oxynitride film, and the like are stacked can be used for the base layer 16.

Alternatively, a stacked-layer material in which a resin and a film that prevents diffusion of impurities contained in the resin, such as a silicon oxide film, a silicon nitride film, a silicon oxynitride film, and the like are stacked can be used for the base layer 16.

Specifically, a stack including a base layer 610b having flexibility, a barrier film 610a inhibiting diffusion of impurities, and a resin layer 610c attaching the base layer 610b to the barrier film 610a can be used (see FIG. 6A).

<<Flexible Printed Circuit>>

The flexible printed circuit FPC1 supplies a timing signal, a power supply potential, and the like, and is supplied with a sensor signal.

<<Display Portion>>

The display portion 500 includes the pixel 502, the scan lines, the signal lines, and a base layer 510 (see FIG. 5).

Note that the display portion 500 may be formed in such a manner that a film for forming the display portion 500 are formed over the base layer 510 and processed.

The display portion 500 may be formed in such a manner that part of the display portion 500 is formed over another base layer and transferred to the base layer 510.

<<Pixel>>

The pixel 502 includes a sub-pixel 502B, a sub-pixel 502G, and a sub-pixel 502R, and each sub-pixel includes a display element and a pixel circuit for driving the display element.

<<Pixel Circuit>>

An active matrix method in which an active element is included in a pixel or a passive matrix method in which an active element is not included in a pixel can be employed for the display portion.

In an active matrix method, as an active element (a non-linear element), not only a transistor but also various active elements (non-linear elements) can be used. For example, a metal insulator metal (MIM), a thin film diode (TFD), or the like can also be used. Since such an element has few numbers of manufacturing steps, manufacturing cost can be reduced or yield can be improved. Alternatively, since the size of the element is small, the aperture ratio can be improved, so that power consumption can be reduced or higher luminance can be achieved.

As a method other than the active matrix method, the passive matrix method in which an active element (a non-linear element) is not used can also be used. Since an active element (a non-linear element) is not used, the number of manufacturing steps is small, so that manufacturing cost can be reduced or yield can be improved. Alternatively, since an active element (a non-linear element) is not used, the aperture ratio can be improved, so that power consumption can be reduced or higher luminance can be achieved, for example.

The pixel circuit includes a transistor 502t, for example.

The display portion 500 includes an insulating film 521 covering the transistor 502t. The insulating film 521 can be used as a layer for planarizing unevenness caused by the pixel circuit. A stacked-layer film including a layer that can prevent diffusion of impurities can be used as the insulating film 521. This can prevent the reliability of the transistor 502t or the like from being lowered by diffusion of unintentional impurities.

<<Display Element>>

Various display elements can be used for the display portion 500. For example, display elements (electronic ink) that perform display by an electrophoretic method, an electronic liquid powder (registered trademark) method, an electrowetting method, or the like, MEMS shutter display elements, optical interference type MEMS display elements, and liquid crystal elements can be used.

Alternatively, display elements which can be used for a transmissive liquid crystal display, a transflective liquid crystal display, a reflective liquid crystal display, a direct-view liquid crystal display, and the like can be used.

For example, organic electroluminescent elements that emit light of different colors may be included in sub-pixels.

For example, an organic electroluminescence element which emits white light can be used.

For example, a light-emitting element 550R includes a lower electrode, an upper electrode, and a layer containing a light-emitting organic compound between the lower electrode and the upper electrode.

The sub-pixel 502R includes a light-emitting module 580R. The sub-pixel 502R includes the light-emitting element 550R and the pixel circuit that can supply power to the light-emitting element 550R and includes the transistor 502t. Furthermore, the light-emitting module 580R includes the light-emitting element 550R and an optical element (e.g., the coloring layer CFR).

Note that to efficiently extract light having a certain wavelength, a microresonator structure may be provided in the light-emitting module 580R. Specifically, a layer containing a light-emitting organic compound may be provided between a film which reflects visible light which is provided to efficiently extract certain light and a semi-transmissive and semi-reflective film.

The light-emitting module 580R includes the coloring layer CFR on the light extraction side. The coloring layer transmits light of a particular wavelength and is, for example, a layer that selectively transmits light of red, green, or blue color. Note that other sub-pixels may be provided so as to overlap with the window portions, which are not provided with the coloring layers, so that light from the light-emitting element can be emitted without passing through the coloring layers.

The coloring layer CFR is positioned in a region overlapping with the light-emitting element 550R. Accordingly, part of light emitted from the light-emitting element 550R passes through the coloring layer CFR and is emitted to the outside of the light-emitting module 580R as indicated by an arrow in the figure.

The light-blocking layer BM is located so as to surround the coloring layer (e.g., the coloring layer CFR).

Note that in the case where a sealant 560 is provided on a side from which light is extracted, the sealant 560 may be in contact with the light-emitting element 550R and the coloring layer CFR.

The lower electrode is provided over the insulating film 521. A partition 528 with an opening overlapping the lower electrode is provided. Note that part of the partition 528 overlaps an end portion of the lower electrode.

The lower electrode is included in the light-emitting element (e.g., the light-emitting element 550R); the layer containing a light-emitting organic compound is provided between the upper electrode and the lower electrode. The pixel circuit supplies power to the light-emitting element.

Over the partition 528, a spacer that controls the gap between the base layer 16 and the base layer 510 is provided.

In the case of a transflective liquid crystal display or a reflective liquid crystal display, some or all of pixel electrodes function as reflective electrodes. For example, some or all of pixel electrodes are formed to contain aluminum, silver, or the like.

Furthermore, storage circuit such as an SRAM can be provided under the reflective electrodes, so that power consumption can further be reduced. A structure suitable for employed display elements can be selected from among a variety of structures of pixel circuits.

<<Base Layer 510>>

For the base layer 510, a material flexible can be used. For example, a material similar to the material that can be used for the base layer 16 can be used for the base layer 510.

Note that in the case where the base layer 510 need not have a light-emitting property, for example, a material which does not have a light-emitting property, specifically, SUS, aluminum, or the like, can be used.

For example, a stack in which a base layer 510b flexible, a barrier film 510a that prevents diffusion of impurities, and a resin layer 510c attaching the barrier film 510a to the base layer 510b are stacked can be preferably used for the base layer 510 (see FIG. 6A).

<<Sealant>>

The sealant 560 attaches the base layer 16 to the base layer 510. The sealant 560 has a higher refractive index than air. In the case of extracting light to the sealant 560 side, the sealant 560 also serves as an optical adhesive layer.

Note that the pixel circuits and the light-emitting elements (e.g., light-emitting element 550R) are provided between the base layer 510 and the base layer 16.

<<Configuration of Driver Circuit>>

The driver circuit 503g supplies a selection signal. For example, the selection signal is supplied to the scan line. Furthermore, the driver circuit 503s which supplies an image signal may be provided. For example, a transistor 503t or a capacitor 503c can be used in the driver circuit 503s. For example, a shift register, a flip-flop circuit, a combination circuit, or the like can be used as the driver circuit 503g or the driver circuit 503g. Note that transistors that can be formed in the same process and over the same substrate as those of the pixel circuit can be used in the driver circuits.

<<Wirings>>

The display portion 500 includes wirings such as scan lines, signal lines, and power supply lines. Various conductive films can be used. For example, a material similar to that of the conductive film that can be used for the input device 600 can be used.

The display portion 500 includes a wiring 511 through which a signal can be supplied. The wiring 511 is provided with a terminal 519. Note that the flexible printed circuit FPC2 through which a signal such as an image signal or a synchronization signal can be supplied is electrically connected to the terminal 519.

Note that a printed wiring board (PWB) may be attached to the flexible printed circuit FPC2.

<<Other Components>>

The input/output device 500TP includes an anti-reflective layer 670p at a position overlapping with pixels. As the anti-reflective layer 670p, a circular polarizing plate can be used, for example.

<Modification Example of Input/Output Device>

Any of various kinds of transistors can be used for the input device 600 and/or the display device 500

FIG. 6A illustrates a structure in which a bottom-gate transistor is used in the input device 600.

A structure of the case of using bottom-gate transistors in the display portion 500 is illustrated in FIGS. 6A and 6B.

For example, a semiconductor layer containing an oxide semiconductor, amorphous silicon, or the like can be used in the transistor 502t and the transistor 503t illustrated in FIG. 6A.

For example, a semiconductor layer containing polycrystalline silicon that is obtained by crystallization process such as laser annealing can be used in the transistor 502t and the transistor 503t illustrated in FIG. 6B.

A structure of the case of using top-gate transistors in the display portion 500 is illustrated in FIG. 6C.

For example, a semiconductor layer containing polycrystalline silicon, a single crystal silicon film that is transferred from a single crystal silicon substrate, or the like can be used in the transistor 502t and the transistor 503t illustrated in FIG. 6C.

This embodiment can be combined with any of the other embodiments in this specification as appropriate.

Embodiment 4

In this embodiment, a structure of a data processing device of one embodiment of the present invention will be described with reference to FIGS. 7A to 7C.
C.

Figure 7A:
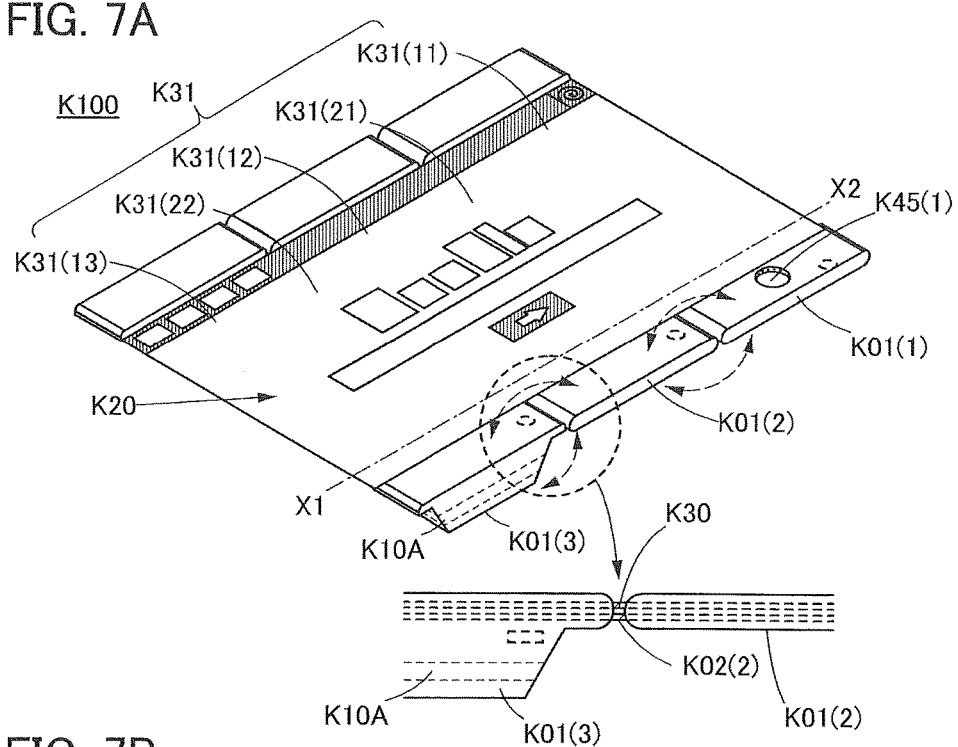
FIGS. 7A to 7C are projection views illustrating a structure of a data processing device according to an embodiment.
Figure 7B:
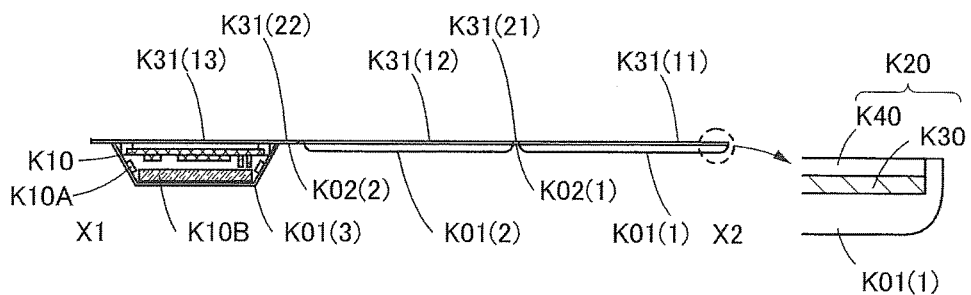
Figure 7C:
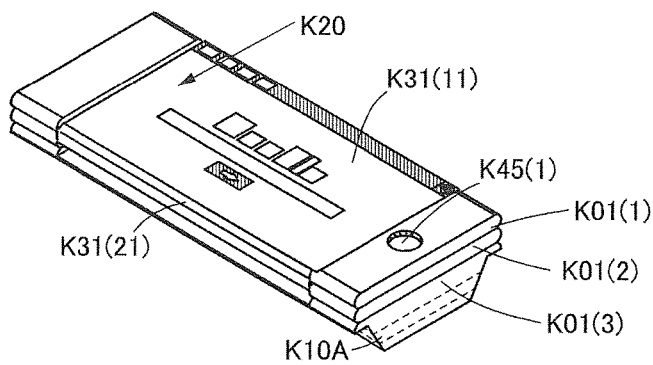

FIGS. 7A to 7C illustrate the data processing device of one embodiment of the present invention.

FIG. 7A is a projection view illustrating an input/output device K20 of a data processing device K100 of one embodiment of the present invention which is unfolded. FIG. 7B is a cross-sectional view of the data processing device K100 along the cutting plane line X1-X2 in FIG. 7A. FIG. 7C is a projection view illustrating the input/output device K20 that is folded.

<Structural Example of Data Processing Device>

The data processing device K100 described in this embodiment includes the input/output device K20, an arithmetic device K10, and a housing K01(1) to a housing K01(3) (see FIGS. 7A to 7C).

<<Input/Output Device>>

The input/output device K20 includes a display portion K30 and an input device K40. The input/output device K20 is supplied with the image data V and supplies the sensing data S.

The display portion K30 is supplied with the image data V, and an input device K40 supplies the sensing data S (see FIG. 7B).

The input/output device K20 in which the input device K40 and the display portion K30 overlap with each other serves not only as the display portion K30 but also as the input device K40.

Note that the input/output device K20 using a touch sensor as the input device K40 and a display panel as the display portion K30 can be referred to as a touch panel.

<<Display Portion>>

The display portion K30 includes a region K31 where a first region K31(11), a first bendable region K31(21), a second region K31(12), a second bendable region K31(22), and a third region K31(13) are arranged in stripes in this order (see FIG. 7A).

The display portion K30 can be folded and unfolded along a first fold line formed in the first bendable region K31(21) and a second fold line formed in the second bendable region K31(22) (see FIGS. 7A and 7C).

<<Arithmetic Device>>

The arithmetic device K10 includes an arithmetic device and a storage unit that stores a program to be executed by the arithmetic device. The arithmetic device K10 supplies the image data V and is supplied with the sensing data S.

<<Housing>>

The housings include the housing K01(1), a hinge K02(1), the housing K01(2), a hinge K02(2), and the housing K01(3) which are placed in this order.

In the housing K01(3), the arithmetic device K10 is stored. In addition, the housing K01(1) to the housing K01(3) hold the input/output device K20 enable the input/output device K20 to be folded and unfolded (see FIG. 7B).

In the example described in this embodiment, the data processing device has the three housings connected with one another with the two hinges. The data processing device having this structure can be folded with the input/output device K20 bent at two positions.

Note that n housings (n is a natural number of two or more) may be connected with one another with (n−1) hinges. The data processing device having this structure can be folded with the input/output device K20 bent at (n−1) positions.

The housing K01(1) overlaps with the first region K31(11) and is provided with a button K45(1).

The housing K01(2) overlaps with the second region K31(12).

The housing K01(3) overlaps with the third region K31(13) and stores the arithmetic device K10, an antenna K10A, and a battery K10B.

The hinge K02(1) overlaps with the first bendable region K31(21) and connects the housing K01(1) rotatably to the housing K01(2).

The hinge K02(2) overlaps with the second bendable region K31(22) and connects the housing K01(2) rotatably to the housing K01(3).

The antenna K10A is electrically connected to the arithmetic device K10 and supplies a signal or is supplied with a signal.

In addition, the antenna K10A is wirelessly supplied with power from an external device and supplies power to the battery K10B.

The battery K10B is electrically connected to the arithmetic device K10 and supplies power or is supplied with power.

<<Folding Sensor>>

A folding sensor K41 determines whether the housing is folded or unfolded and supplies data showing the state of the housing.

The data showing the state of the housing is supplied to the arithmetic device K10.

In the case where the data showing the state of the housing is data showing a folded state, the arithmetic device K10 supplies the image data V including a first image to the first region K31(11) (see FIG. 7C).

In the case where the data showing the state of the housing K01 is data showing an unfolded state, the arithmetic device K10 supplies the image data V to the region K31 of the display portion K30 (see FIG. 7A).

This embodiment can be combined with any of the other embodiments in this specification as appropriate.

Embodiment 5

In this embodiment, structures of data processing devices of one embodiment of the present invention is described with reference to FIGS. 8A1 to 8C2.

FIGS. 8A1 to 8C2 illustrate the data processing devices of one embodiment of the present invention.

FIGS. 8A1 to 8A3 are projection views illustrating a data processing device of one embodiment of the present invention.

FIGS. 8B1 and 8B2 are projection views illustrating a data processing device of one embodiment of the present invention.

FIGS. 8C1 and 8C2 are a top view and a bottom view of a data processing device of one embodiment of the present invention.

<<Data Processing Device A>>

A data processing device 3000A includes an input/output portion 3120 and a housing 3101 supporting the input/output portion 3120 (see FIGS. 8A1 to 8A3).

The data processing device 3000A further includes an arithmetic portion, a memory portion storing a program that is executed by the arithmetic portion, and a power source such as a battery supplying power for driving the arithmetic portion.

Note that the housing 3101 stores the arithmetic portion, the memory portion, the battery, and the like.

The data processing device 3000A can display data on its side surface and/or top surface.

A user of the data processing device 3000A can supply operation instructions by using a finger in contact with the side surface and/or the top surface.

<<Data Processing Device B>>

A data processing device 3000B includes the input/output portion 3120 and an input/output portion 3120b (see FIGS. 8B1 and 8B2).

The data processing device 3000B further includes the housing 3101 and a belt-shaped flexible housing 3101b that support the input/output portion 3120.

The data processing device 3000B further includes the housing 3101 supporting the input/output portion 3120b.

The data processing device 3000B further includes an arithmetic portion, a memory portion storing a program that is executed by the arithmetic portion, and a power source such as a battery supplying power for driving the arithmetic portion.

Note that the housing 3101 stores the arithmetic portion, the memory portion, the battery, and the like.

The data processing device 3000B can display data on the input/output portion 3120 supported by the belt-shaped flexible housing 3101b.

A user of the data processing device 3000B can supply operation instructions by using a finger in contact with the input/output portion 3120.

<<Data Processing Device C>>

A data processing device 3000C includes the input/output portion 3120 and the housings 3101 and 3101b supporting the input/output portion 3120 (see FIGS. 8C1 and 8C2).

The input/output portion 3120 and the housing 3101b have flexibility.

The data processing device 3000C further includes an arithmetic portion, a memory portion storing a program that is executed by the arithmetic portion, and a power source such as a battery supplying power for driving the arithmetic portion.

Note that the housing 3101 stores the arithmetic portion, the memory portion, the battery, and the like.

The data processing device 3000C can be folded in two at the housing 3101b.

Note that this embodiment can be combined with any of the other embodiments described in this specification as appropriate.

This application is based on Japanese Patent Application serial no. 2014-112206 filed with the Japan Patent Office on May 30, 2014, the entire contents of which are hereby incorporated by reference.

What is claimed is:

1. A sensor comprising:
   a sensor element;
   a sensor circuit electrically connected to the sensor element; and
   a flexible base layer supporting the sensor element and the sensor circuit,
   wherein the sensor circuit comprises a first transistor, a second transistor, and a third transistor,
   wherein a gate of the first transistor is electrically connected to one of a source and a drain of the third transistor and to a first electrode of the sensor element,
   wherein one of a source and a drain of the first transistor is electrically and directly connected to a second electrode of the sensor element and to a first wiring through which a control signal capable of controlling a potential of the second electrode of the sensor element is configured to be supplied,
   wherein the other of the source and the drain of the first transistor is electrically connected to one of a source and a drain of the second transistor,
   wherein a gate of the second transistor is electrically connected to a second wiring,
   wherein the other of the source and the drain of the second transistor is electrically connected to a third wiring,
   wherein a gate of the third transistor is electrically connected to a fourth wiring,
   wherein the other of the source and the drain of the third transistor is electrically connected to a fifth wiring, and
   wherein a capacitance of the sensor element is configured to be changed when an object is proximate to the first electrode of the sensor element or the second electrode of the sensor element.

2. The sensor according to claim 1, wherein the sensor circuit is configured to supply a sensor signal based on a change in the capacitance of the sensor element.

3. The sensor according to claim 1, wherein the sensor element is a capacitor.

4. The sensor according to claim 1, wherein the third wiring is electrically connected to one of a source and a drain of a fourth transistor included in a converter.

5. A data processing device comprising the sensor according to claim 1.

6. The sensor according to claim 1, wherein the flexible base layer comprises an organic resin film or a plastic film.

7. The sensor according to claim 1, wherein the object is a finger of a user.

8. A sensor comprising:
   a sensor element;
   a sensor circuit electrically connected to the sensor element; and
   a flexible base layer supporting the sensor element and the sensor circuit, wherein the sensor circuit comprises a first transistor, a second transistor, and a third transistor, wherein a gate of the first transistor is electrically connected to one of a source and a drain of the third transistor and to a first electrode of the sensor element, wherein one of a source and a drain of the first transistor is electrically and directly connected to a second electrode of the sensor element and to a first wiring through which a control signal capable of controlling a potential of the second electrode of the sensor element is configured to be supplied, wherein the other of the source and the drain of the first transistor is electrically connected to one of a source and a drain of the second transistor, wherein a gate of the second transistor is electrically connected to a second wiring through which a selection signal is configured to be supplied, wherein the other of the source and the drain of the second transistor is electrically connected to a third wiring through which a sensor signal is configured to be supplied, wherein a gate of the third transistor is electrically connected to a fourth wiring through which a reset signal is configured to be supplied, wherein the other of the source and the drain of the third transistor is electrically connected to a fifth wiring through which a ground potential is configured to be supplied, and wherein a capacitance of the sensor element is configured to be changed when an object is proximate to the first electrode of the sensor element or the second electrode of the sensor element.

9. The sensor according to claim 8, wherein the sensor circuit is configured to supply the sensor signal based on a change in the capacitance of the sensor element.

10. The sensor according to claim 8, wherein the sensor element is a capacitor.

11. The sensor according to claim 8, wherein the third wiring is electrically connected to one of a source and a drain of a fourth transistor included in a converter.

12. A data processing device comprising the sensor according to claim 8.

13. An input/output device comprising:
a flexible input device comprising:
  a plurality of sensor units that comprise window portions transmitting visible light and are arranged in a matrix; and
  a first flexible base layer supporting the plurality of sensor units; and
a display portion comprising a plurality of pixels that are arranged in a matrix and overlap with the window portions and a second flexible base layer supporting the plurality of pixels,
wherein each of the plurality of sensor units comprises a sensor element and a sensor circuit electrically connected to the sensor element, wherein the sensor circuit comprises a first transistor, a second transistor, and a third transistor, wherein a gate of the first transistor is electrically connected to one of a source and a drain of the third transistor and to a first electrode of the sensor element, wherein one of a source and a drain of the first transistor is electrically and directly connected to a second electrode of the sensor element and to a first wiring through which a control signal capable of controlling a potential of the second electrode of the sensor element is configured to be supplied, wherein the other of the source and the drain of the first transistor is electrically connected to one of a source and a drain of the second transistor, wherein a gate of the second transistor is electrically connected to a second wiring, wherein the other of the source and the drain of the second transistor is electrically connected to a third wiring, wherein a gate of the third transistor is electrically connected to a fourth wiring, wherein the other of the source and the drain of the third transistor is electrically connected to a fifth wiring, and wherein a capacitance of the sensor element is configured to be changed when an object is proximate to the first electrode of the sensor element or the second electrode of the sensor element.

14. The input/output device according to claim 13,
wherein the plurality of sensor units along a row direction is electrically connected to the second wiring, and
wherein the plurality of sensor units along a column direction is electrically connected to the third wiring.

15. The input/output device according to claim 13,
wherein a selection signal is configured to be supplied through the second wiring, and
wherein a sensor signal is configured to be supplied through the third wiring.

16. The input/output device according to claim 15, wherein the sensor circuit is configured to supply the sensor signal based on a change in the capacitance of the sensor element.

17. The input/output device according to claim 13, wherein the sensor circuit is placed so as to overlap with gaps between the window portions.

18. The input/output device according to claim 13,
wherein a reset signal is configured to be supplied through the fourth wiring, and
wherein a ground potential is configured to be supplied through the fifth wiring.

19. The input/output device according to claim 13, wherein the sensor element is a capacitor.

20. The input/output device according to claim 13, wherein the third wiring is electrically connected to one of a source and a drain of a fourth transistor included in a converter.

21. A data processing device comprising the input/output device according to claim 13.

* * * * *